(12) United States Patent
Wakita

(10) Patent No.: US 10,177,613 B2
(45) Date of Patent: Jan. 8, 2019

(54) ROTOR AND MOTOR

(71) Applicant: MABUCHI MOTOR CO., LTD., Chiba (JP)

(72) Inventor: Tadayuki Wakita, Chiba (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 1252 days.

(21) Appl. No.: 14/167,903

(22) Filed: Jan. 29, 2014

(65) Prior Publication Data

US 2014/0210294 A1 Jul. 31, 2014

(30) Foreign Application Priority Data

Jan. 31, 2013 (JP) .................................. 2013-017977

(51) Int. Cl.
*H02K 1/27* (2006.01)

(52) U.S. Cl.
CPC .......... *H02K 1/2713* (2013.01); *H02K 1/2773* (2013.01)

(58) Field of Classification Search
CPC ...... H02K 1/2713; H02K 1/2773; H02K 1/27; H02K 1/276; H02K 1/2766
USPC .. 310/156.07, 268, 191, 261.1, 267, 156.37, 310/156.53
See application file for complete search history.

(56) References Cited

U.S. PATENT DOCUMENTS

| | | | | |
|---|---|---|---|---|
| 4,481,437 A | * | 11/1984 | Parker ................. | H02K 1/2706 310/154.43 |
| 2004/0007930 A1 | * | 1/2004 | Asai ..................... | H02K 1/2746 310/156.53 |
| 2005/0285468 A1 | * | 12/2005 | Fukushima ......... | H02K 1/2706 310/156.53 |
| 2006/0284507 A1 | * | 12/2006 | Murakami ............. | H02K 21/24 310/156.37 |

(Continued)

FOREIGN PATENT DOCUMENTS

| | | |
|---|---|---|
| EP | 1416618 A1 | 5/2004 |
| EP | 2639936 A1 | 3/2012 |
| JP | 2006-217771 A | 8/2006 |

(Continued)

OTHER PUBLICATIONS

European Search Report dated May 22, 2014 in German Application No. 14153140.0-1804, 7 pages.

(Continued)

*Primary Examiner* — Dang Le
(74) *Attorney, Agent, or Firm* — Schwabe Williamson & Wyatt, PC

(57) ABSTRACT

A rotor includes a circular rotor core, a plurality of θ magnets, and ring-shaped Z magnets. The rotor core has a plurality of magnet holding sections formed radially with a rotating shaft as the center. The θ magnets are contained in and held by the magnet holding sections such that the same magnetic poles of adjacent magnets face each other in a circumferential direction of the rotor core. The rotor core is such that N-poles and S-poles are alternately formed in a (Continued)

circumferential direction of an outer circumferential surface of the rotor core. The Z magnets are such that N-poles and S-poles are alternately formed circularly on an opposed face of the auxiliary magnet facing an end face of the rotor core in a direction of the rotating shaft.

11 Claims, 36 Drawing Sheets

(56) References Cited

U.S. PATENT DOCUMENTS

2014/0042861 A1* 2/2014 Kawaji ............... H02K 1/276
310/156.53

FOREIGN PATENT DOCUMENTS

| JP | 2012-231578 | 11/2012 |
|----|----|----|
| JP | 2012231578 A | 11/2012 |

OTHER PUBLICATIONS

Machine Translation of JP2006-217771, dated Aug. 17, 2006, entitled: Movable Permanent Magnet Electric Machine; 9 pages.
Office Action issued in CN Application No. 201410035605.4, including English translation; dated Feb. 14, 2017 ; 14 pages.
European office action for Application No. 14 153 140.0 dated May 26, 2017; 5 pages.

* cited by examiner

100

44

46

60

60

110

120

130

ROTOR AND MOTOR

CROSS-REFERENCE TO RELATED APPLICATIONS

This application is based upon and claims the benefit of priority from the prior Japanese Patent Application No. 2013-17977, filed on Jan. 31, 2013, the entire content of which is incorporated herein by reference.

BACKGROUND OF THE INVENTION

1. Field of the Invention

The present invention relates to a rotor and a motor.

2. Description of the Related Art

In the conventional practice, motors are used as driving sources of various types of apparatuses and products. For example, the motors are used for business machines, such as printers and copying machines, various kinds of home electric appliances, and power assist sources of vehicles, such as automobiles and power-assisted bicycles. In particular, brushless motors are sometimes used as the driving sources of movable parts with high operation frequency in the light of increased durability and reduced noise.

Known as a type of such a brushless motor is an interior permanent magnet (IPM) motor where a permanent magnet is embedded in a rotor. For example, there is an electric motor in which a plurality of plate-like magnets are radially embedded in a rotor yoke and also each magnet is disposed such that the same poles of adjacent magnets face each other circumferentially.

In this electric motor, disk-like auxiliary permanent magnets are provided at both end faces of the rotor in a direction of a rotating shaft, for the purpose of reducing the magnetic flux that may have leaked from the magnets embedded in the rotor yoke in the direction of the rotating shaft.

The auxiliary permanent magnets in the above-described electric motor are configured such that a plurality of magnetic poles are circularly formed on a surface facing the rotor core. Thus, there is the following problem to be solved. That is, the repulsive force, between the rotor core and the auxiliary permanent magnets, and their mutual demagnetization resistance are varied depending on how the auxiliary permanent magnets are mounted to the rotor core.

SUMMARY OF THE INVENTION

The present invention has been made in view of the foregoing circumstances, and a purpose thereof is to provide a technology by which to reduce the flux leakage from a rotor of a motor and increase an average magnetic flux density in an outer circumferential part of the rotor.

To resolve the foregoing problem, a rotor according to one embodiment of the present invention includes: a circular rotor core; a plurality of plate-like magnets; and a pair of ring-shaped auxiliary magnets disposed, in both end faces of the rotor core in a direction of a rotating shaft thereof, respectively, in such a manner as to face the rotor core. The rotor core has a plurality of magnet holding sections formed radially with the rotating shaft as a center. The plate-like magnets are held in the magnet holding section such that the same magnetic poles of adjacent magnets face each other in a circumferential direction of the rotor core; the rotor core is such that an N-pole and an S-pole are alternately formed in a circumferential direction of an outer circumferential surface of the rotor core; and the auxiliary magnets are such that an N-pole and an S-pole are alternately formed circularly on an opposed face of the auxiliary magnet facing an end face of the rotor core in the direction of the rotating shaft thereof, and the auxiliary magnets are provided such that, in a phase in a rotational direction of the rotor core, the phase of the N-pole of the opposed face is shifted relative to the phase of the N-pole in the outer circumferential surface of the rotor core.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
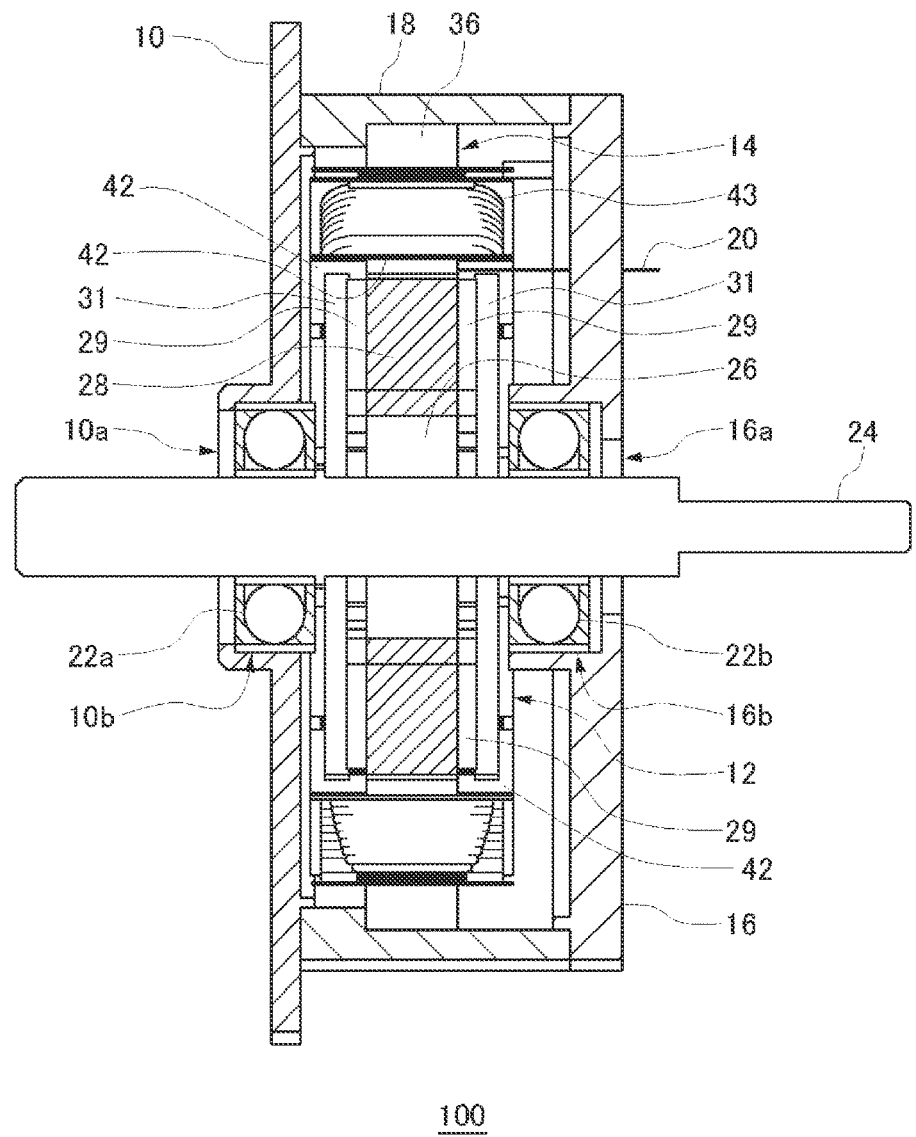
FIG. 1 is a cross-sectional view of a brushless motor according to a first embodiment.

The invention will now be described by reference to the preferred embodiments. This does not intend to limit the scope of the present invention, but to exemplify the invention.

A rotor according to one embodiment of the present invention includes: a circular rotor core; a plurality of plate-like magnets; and a pair of ring-shaped auxiliary magnets disposed, in both end faces of the rotor core in a direction of a rotating shaft thereof, respectively, in such a manner as to face the rotor core. The rotor core has a plurality of magnet holding sections formed radially with the rotating shaft as a center. The plate-like magnets are contained in and held by the magnet holding section such that the same magnetic poles of adjacent magnets face each other in a circumferential direction of the rotor core. The rotor core is such that an N-pole and an S-pole are alternately formed in a circumferential direction of an outer circumferential surface of the rotor core. The auxiliary magnets are such that an N-pole and an S-pole are alternately formed circularly on an opposed face of the auxiliary magnet facing an end face of the rotor core in the direction of the rotating shaft thereof. The auxiliary magnets are provided such that, in a phase in a rotational direction of the rotor core, the phase of the N-pole of the opposed face is shifted or displaced relative to the phase of the N-pole in the outer circumferential surface of the rotor core.

By employing this embodiment, the repulsive force exerted between the rotor core, in which the plate-like magnets are contained, and the auxiliary magnets can be reduced. Also, the demagnetization resistance of the plate-like magnets can be improved. The ring-shaped auxiliary magnets may be integrally-formed auxiliary magnets of ring shape or may be each constructed such that a plurality of fan-shaped small pieces are disposed in a ring.

One of the pair of ring-shaped auxiliary magnets may be provided such that, in the phase in the rotational direction of the rotor core, the phase of the N-pole of the opposed face is shifted, by α degrees (α>0), relative to the phase of the N-pole in the outer circumferential surface of the rotor core. The other of the pair of ring-shaped auxiliary magnets may be provided such that, in the phase in the rotational direction of the rotor core, the phase of the N-pole of the opposed face is shifted, by −α degrees (α>0), relative to the phase of the N-pole in the outer circumferential surface of the rotor core.

A shift electrical angle φe between the phase of the N-pole of the opposed face of the auxiliary magnet and the phase of the N-pole in the outer circumferential surface of the rotor core may be so set as to satisfy the following inequalities.

$$5 \text{ degrees} \leq \phi e \leq 50 \text{ degrees}.$$

As a result, the repulsive force exerted between the rotor core and the auxiliary magnets is suppressed while the flux leakage from the rotor is reduced. Hence, the average magnetic flux density in an outer circumferential part of the rotor can be increased.

When the phase of the N-pole of the opposed face of the auxiliary magnet is shifted relative to the phase of the N-pole in the outer circumferential surface of the rotor core, a shift length X [mm], relative to a position of the N-pole in the outer circumferential surface, at a position shifted in the rotational direction of the rotor core in an outer circumferential part corresponding to the phase of the N-pole of the opposed face of the auxiliary magnet, may be so set as to satisfy the following inequalities.

0.2≤X/Lm≤2.0, where Lm [mm] is the thickness of the plate-like magnet in the circumferential direction of the rotor core. Thereby, the repulsive force exerted between the rotor core and the auxiliary magnets is suppressed while the flux leakage from the rotor is reduced. Thus, the average magnetic flux density in the outer circumferential part of the rotor can be increased.

The thickness of the plate-like magnet in the circumferential direction of the rotor core may be in a range of 1 mm to 25 mm.

The number P of magnetic poles of the rotor may be any one of 12 poles, 14 poles, 16 poles, 18 poles and 20 poles. As a result, the motor characteristics can be improved in a well-balanced state.

The number Q of magnetic poles of the auxiliary magnets may be identical to the number P of magnetic poles of the rotor. As a result, the flux leakage from the rotor can be further reduced.

The thickness of the auxiliary magnet in the direction of the rotating shaft thereof may be in a range of 1 mm to 15 mm.

Another embodiment of the present invention relates to a motor. This motor includes: a cylindrical stator where a plurality of winding wires are placed; the above-described rotor provided in a center of the stator; and a power feed section for supplying the power to the plurality of winding wires of the stator.

By employing this embodiment, the average magnetic flux density in the outer circumferential part of the rotor can be increased, thereby contributing to the improvement of the motor torque.

Optional combinations of the aforementioned constituting elements, and implementations of the invention in the form of methods, apparatuses, systems, and so forth may also be practiced as additional modes of the present invention.

The embodiments of the present invention will be hereinbelow described with reference to drawings. Note that in all of the Figures the same components are given the same reference numerals and the repeated description thereof is omitted as appropriate. The structures described hereinbelow are only exemplary and does not limit the scope of the present invention. A description is given hereunder using a brushless motor of an inner rotor type as an example.

First Embodiment

[Brushless Motor]

FIG. 1 is a cross-sectional view of a brushless motor according to a first embodiment. A brushless motor (hereinafter referred to as "motor" also) 100 according to the first embodiment includes a front bell (motor front) 10, a rotor 12, a stator 14, an end bell 16, a housing 18, and a power feed section 20.

The front bell 10, which is a plate-shaped member, not only has a hole 10a formed in a central part so that a rotating shaft 24 can penetrate therethrough, but also has a recess 10b, which holds a bearing 22a, formed near the hole 10a. The end bell 16, which is a plate-shaped member, not only has a hole 16a formed in a central part so that the rotating shaft 24 can penetrate therethrough, but also has a recess 16b, which holds a bearing 22b, formed near the hole 16a. The housing 18 is a cylindrical member. The front bell 10, the end bell 16 and the housing 18 constitute a casing of a motor 100.

[Rotor]

Figure 2:
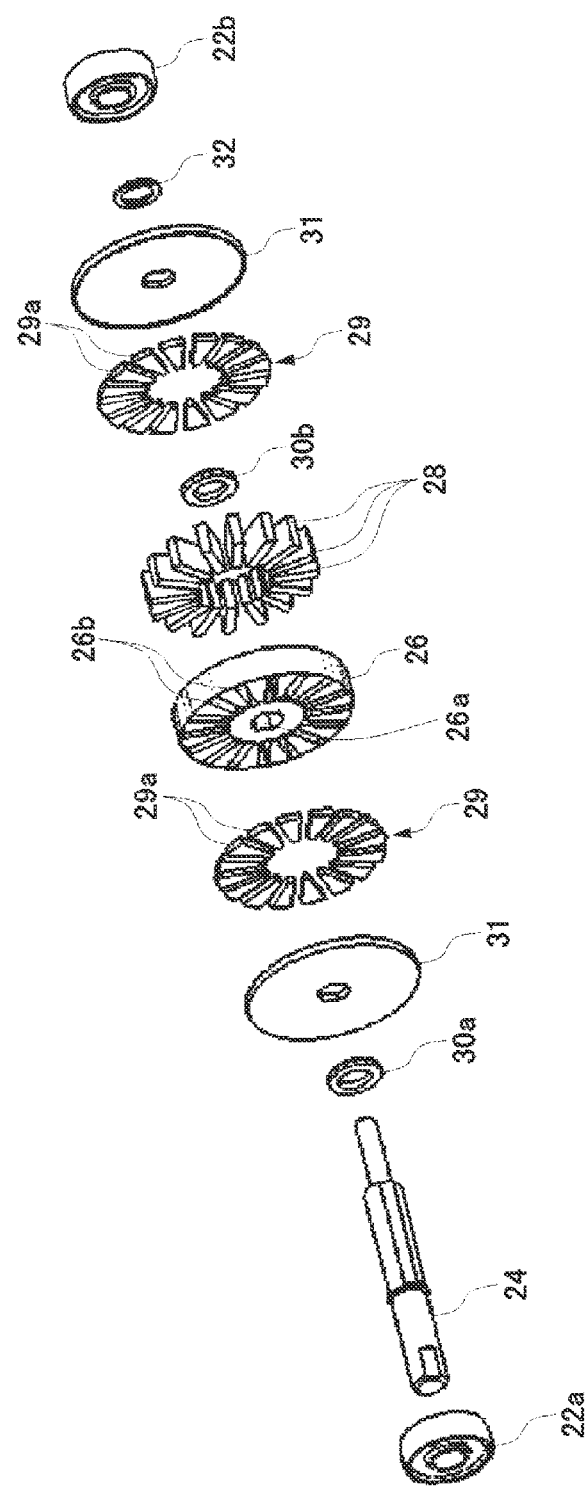
FIG. 2 is an exploded perspective view of a rotor according to a first embodiment.
Figure 3A:
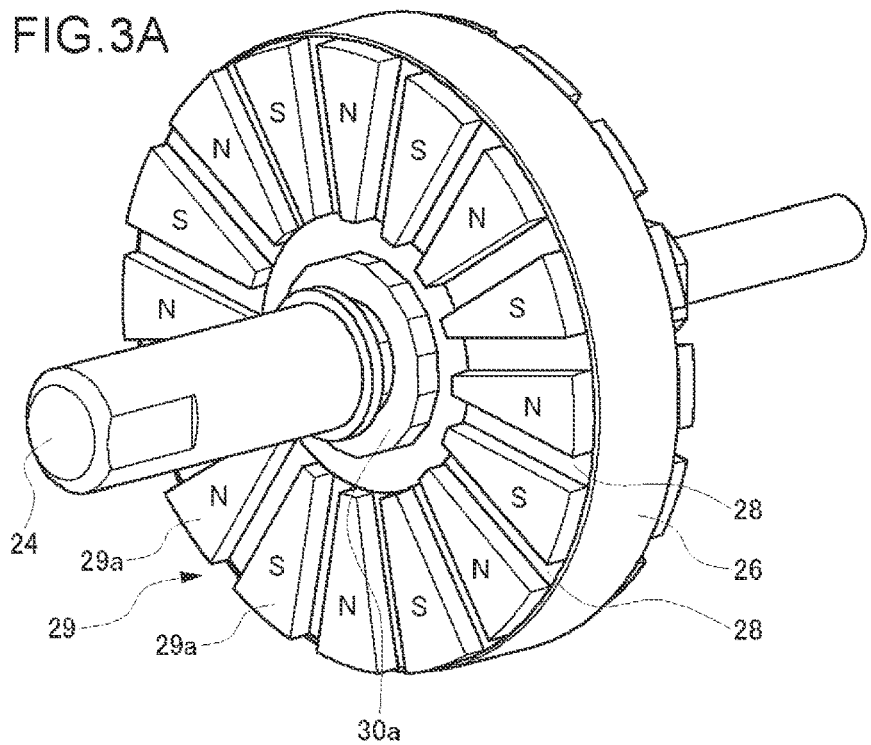
FIG. 3A is a perspective view of a rotor with each member, excluding a bearing, a back yoke and so forth, mounted to a rotating shaft.
Figure 3B:
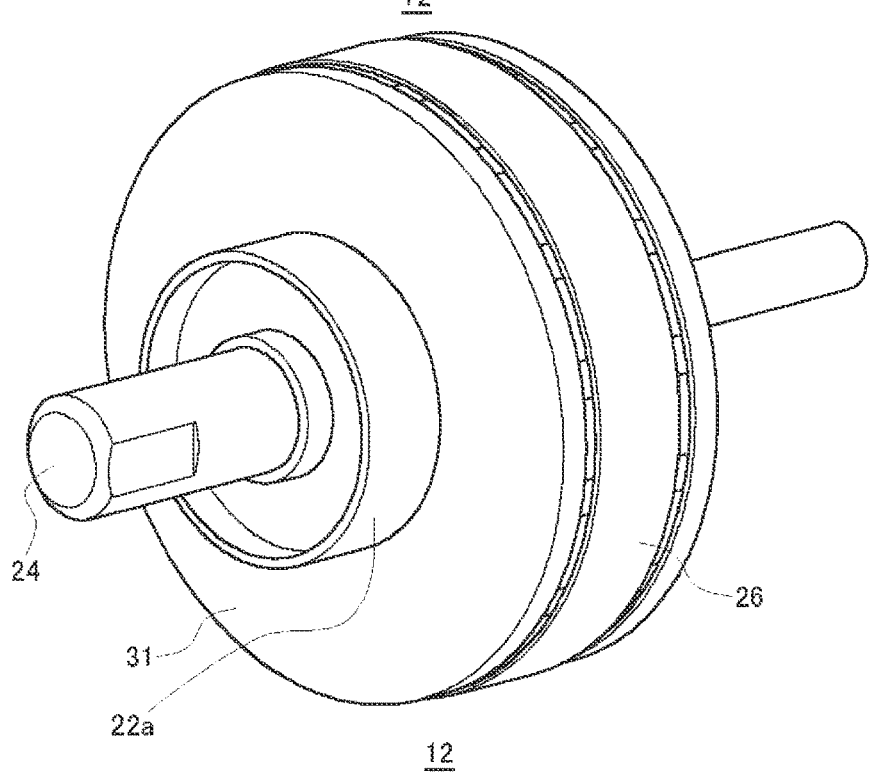
FIG. 3B is a perspective view of a rotor with each member, including a bearing and a back yoke, mounted to a rotating shaft.

FIG. 2 is an exploded perspective view of a rotor according to a first embodiment. FIG. 3A is a perspective view of the rotor with each member, excluding a bearing, a back yoke and so forth, mounted to the rotating shaft 24. FIG. 3B is a perspective view of the rotor with each member, including the bearing and the back yoke, mounted to the rotating shaft 24.

The rotor 12 is comprised of a circular rotor core 26, a plurality of θ magnets 28, Z magnets 29, and a back yoke 31. Here, the Z magnets 29 are a pair of ring-shaped auxiliary magnets disposed in both end faces of the rotor core, respectively, in a direction of the rotating shaft in such a manner as to face the rotor core 26. The Z magnets 29 are each held by the rotor core 26 and the back yoke 31. The Z magnets 29 according to the present embodiment are each constructed such that a plurality (i.e., sixteen) of fan-shaped small pieces 29a are disposed in a ring, and a gap is formed between each small piece 29a. An attractive force acts in between the small pieces 29a and therefore a non-magnetic member may be placed in the gap so that the gap can be kept at regular intervals or a protrusion may be provided in the back yoke 31.

As shown in FIG. 3A, the Z magnets 29 are each constructed such that if an opposed flat face (lower surface) of a given small piece 29a facing an end face of the rotor core 26 in a direction of the rotating shaft is an N-pole, for instance, then a flat face (upper surface) of the given small piece 29a opposite to said opposed face (lower surface) thereof is an S-pole. Thus, the Z magnet 29 is constructed such that N-poles and S-poles are alternately formed circularly on the lower surfaces of the small pieces 29a and the upper surfaces thereof.

A through-hole 26a, which is fixed with the rotating shaft 24 inserted thereinto, is formed in a center of the rotor core 26. Also, the rotor core 26 has a plurality of magnet holding sections 26b that are fixed by inserting the θ magnets 28 thereinto. The θ magnets 28 are of plate-shaped members in accordance with the shape of the magnet holding sections 26b.

Then, each member is assembled in sequence. More specifically, a plurality (i.e., sixteen) of θ magnets 28 are fitted into the corresponding magnet holding sections 26b, and the rotating shaft 24 is inserted into the through-hole 26a of the rotor core 26. Also, the Z magnets 29 are secured to both the end faces of the rotor core 26 in the direction of the rotating shaft, and the back yokes 31 are inserted through the rotating shaft 24 in such a manner as to hold each Z magnet 29 from both sides. Then the bearing 22a is mounted to the rotating shaft 24 by way of a spacer 30a. Also, the bearing 22b is mounted to the rotating shaft 24 by way of a spacer 30b and a spacer 32 for bearing.

Figure 4A:
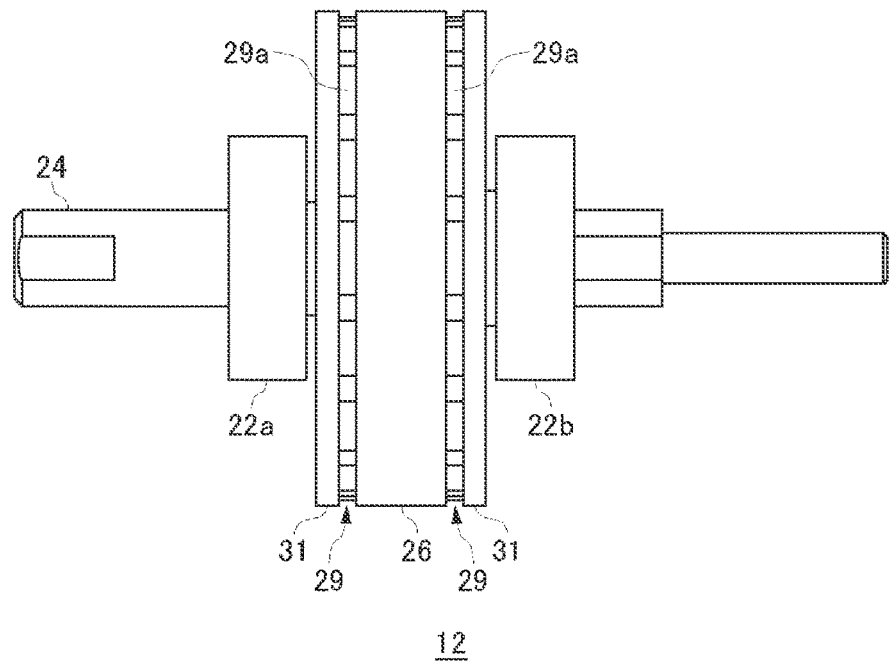
FIG. 4A is a lateral view of a rotor according to a first embodiment.
Figure 4B:
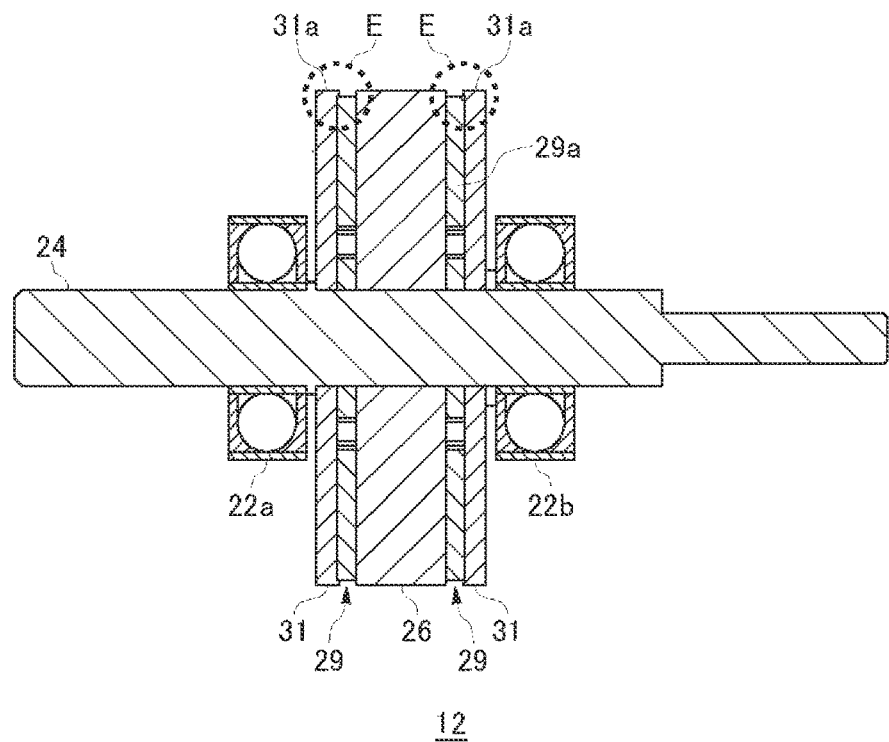
FIG. 4B is a cross-sectional view of a rotor cut along a plane including a rotating shaft.

FIG. 4A is a lateral view of the rotor 12 according to the first embodiment. FIG. 4B is a cross-sectional view of the rotor 12 cut along a plane including the rotating shaft 24.

As shown in regions E in FIG. 4B, a circular catch (thick-walled part) 31a, which is provided for the purpose of preventing the scattering of each Z magnet 29, is formed on an outer edge portion of a surface of the back yoke 31 facing the Z magnet 29. Provision of the catch 31a prevents the small pieces 29a constituting the Z magnet 29 from being scattered outwardly due to the centrifugal force during motor rotation.

[Rotor Core]

Figure 5A:
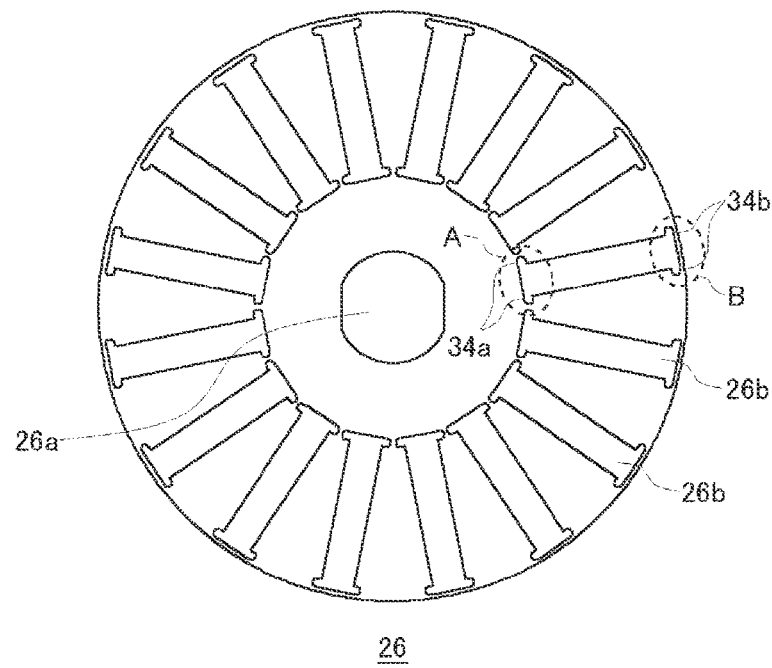
FIG. 5A is a top view of a rotor core according to a first embodiment.
Figure 5B:
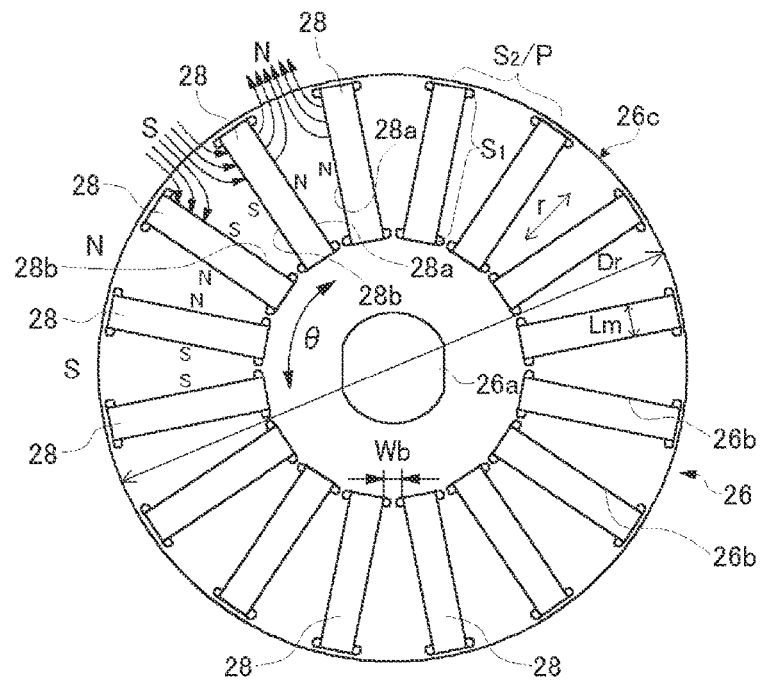
FIG. 5B is a top view showing a state where θ magnets 28 are fitted into the rotor core shown in FIG. 5A.

FIG. 5A is a top view of the rotor core 26 according to the first embodiment. FIG. 5B is a top view showing a state where the θ magnets 28 are fitted into the rotor core 26 shown in FIG. 5A. In the rotor core 26, a plurality of plate-shaped members are laminated. Each of the plurality of plate-shaped members is manufactured such that a nonoriented electromagnetic steel sheet (e.g., silicon steel sheet) or a cold-rolled steel sheet is stamped out into a predetermined shape, as shown in FIG. 5A, by press-forming. Then the magnet holding sections 26b are radially formed with the rotating shaft of the rotor core 26 as the center.

As shown in FIG. 5B, the θ magnets 28 are contained in the magnet holding sections 26b such that the same magnetic pole of one θ magnet 28 as that of another θ magnet 28 adjacent to said one θ magnet 28 faces the same magnet pole of the adjacent θ magnet 28 in circumferential directions θ of the rotor core 26. In other words, the θ magnets 28 are configured such that principal surfaces 28a and 28b, whose surface areas are largest among the six surfaces of each of the adjacent θ magnets 28 that are each an approximately rectangular parallelepiped, are an N-pole and an S-pole, respectively. Thus, the lines of magnetic force emanating from the principal surface 28a are directed outward of the rotor core 26 from a region disposed between these two adjacent θ magnets 28. As a result, the rotor 12 according to the present embodiment functions as sixteen magnets such that eight N-poles and eight S-poles are alternately formed in a circumferential direction of an outer circumferential surface of the rotor core 26.

The θ magnet 28 is a bonded magnet, a sintered magnet or the like, for instance. The bonded magnet is a magnet formed such that a ferromagnetic material is kneaded with a rubber or resin material and then the ferromagnetic material kneaded with such a material undergoes injection molding or compression molding. Where the bonded magnet is used, a high-precision C face (inclined plane) or R face is obtained without having to undergo any postprocessing. On the other hand, the sintered magnet is a magnet formed such that powered ferromagnetic materials are sintered at high temperature. The sintered magnet is more likely to improve the residual magnetic flux density than the bonded magnet is. However, in order to have a high-precision C face or R face, the postprocessing is often required.

The rotor 12 according to the present embodiment is designed to meet the following relation in order to improve the average magnetic flux density in an outer circumferential part of the rotor 12. More specifically, the surface area of the principal surface 28a (28b) having a magnetic pole of the θ magnet 28 is denoted by $S_1$ [mm$^2$], the surface area of an outer circumferential surface 26c of the rotor core 26 is denoted by $S_2$ [mm$^2$], and the number P of magnetic poles of the rotor 12 (e.g., 16 poles in the present embodiment) is denoted by P. Then the rotor 12 is so configured as to meet the condition that is expressed by $S_1 > S_2/P$.

In such a case, the surface area $S_2/P$ of the outer circumferential surface 26c for each θ magnet is smaller than the surface area $S_1$ of the principal surface 28a (28b) of the θ magnet 28 having a magnetic pole. That is, the lines of magnetic force emanating from the principal surface 28a (28b) of one θ magnet 28 having a magnetic pole is directed outward from a partial region of the outer circumferential surface of the rotor 12 (the partial region thereof being denoted by $S_2/P$), which is a narrower region than the principal surface 28a (28b) thereof. Thereby, it is possible to set the average magnetic flux density at a gap between the rotor 12 and the stator 14 larger than or equal to the residual magnetic flux density of the θ magnet 28. As a result, the average magnetic flux density in the outer circumferential part of the rotor 12 can be improved.

A further detailed description is now given of the magnet holding section 26b. As shown in FIG. 5A, circumferential relief parts 34a and 34b are formed in both ends of the rotor core 26 in a radial direction of the rotor. Here, the circumferential relief parts 34a and 34b form gaps when the θ magnet 28 is contained in and held by the magnet holding section 26b.

Figure 6A:
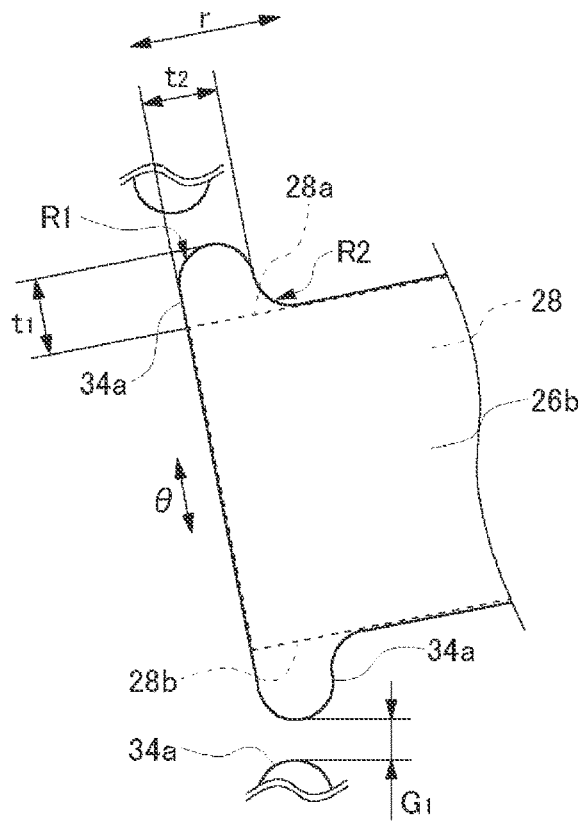
FIG. 6A is an enlarged view of region A in FIG. 5A.
Figure 6B:
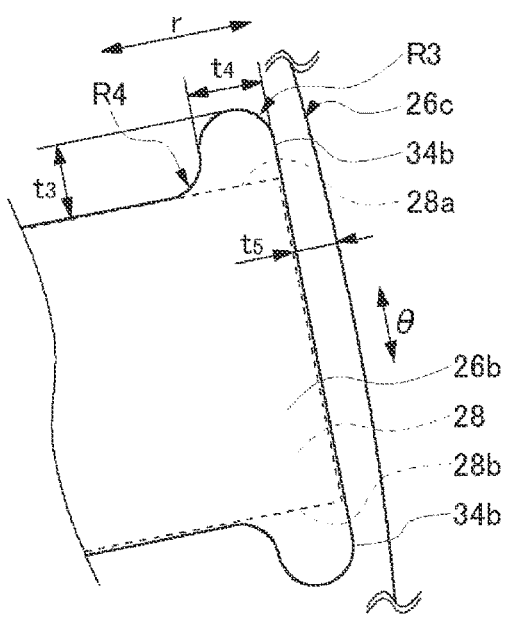
FIG. 6B is an enlarged view of region B in FIG. 5A.

FIG. 6A is an enlarged view of region A in FIG. 5A. FIG. 6B is an enlarged view of region B in FIG. 5A.

As shown in FIG. 6A, the magnet holding section 26b has the circumferential relief parts 34a formed in a radial direction of the rotor core 26 and in a center-side end of the rotor core 26. Here, the circumferential relief parts 34a form gaps when the θ magnet 28 is contained in and held by the magnet holding section 26b. The circumferential relief parts 34a are provided such that they extend toward the circumferential directions θ of the rotor core 26 from the principal surfaces 28a and 28b having magnetic poles of the θ magnet 28 contained in the magnet holding section 26b.

Suppose that the thickness of a single electromagnetic steel sheet or cold-rolled steel sheet that constitutes the rotor core 26 is denoted by T [mm]. Then the dimensions of the circumferential relief part 34a are so set as to satisfy the following inequalities. That is, the thickness $t_1$ of the circumferential relief part 34a in the circumferential directions θ is set such that $t_1 \leq 3T$ and more preferably $t_1 \leq 2T$, and the thickness $t_2$ thereof in a radial direction r is set such that $t_2 \leq 3T$ and more preferably $t_2 \leq 2T$. Also, the diameters of an R1 face and an R2 face of the circumferential relief part 34a are each less than or equal to 1.5 T and more preferably less than or equal to 1.0 T. Also, an interval $G_1$ between adjacent circumferential relief parts 34a is about 1.0 T.

Also, the magnet holding section 26b has the circumferential relief parts 34b formed in a radial direction of the rotor core 26 and in an end opposite to the center side of the rotor core 26. Here, the circumferential relief parts 34b form gaps when the θ magnet 28 is contained in and held by the magnet holding section 26b. The circumferential relief parts 34b are provided such that they extend toward the circumferential directions θ of the rotor core 26 from the principal surfaces 28a and 28b having magnetic poles of the θ magnet 28 contained in the magnet holding section 26b.

The dimensions of the circumferential relief part 34a are so set as to satisfy the following inequalities. That is, the thickness $t_3$ of the circumferential relief part 34b in the circumferential directions θ is set such that $t_3 \leq 3T$ and more preferably $t_3 \leq 2T$, and the thickness $t_4$ thereof in a radial direction r is set such that $t_4 \leq 3T$ and more preferably $t_4 \leq 2T$. Also, the diameters of an R3 face and an R4 face of the circumferential relief part 34b are each less than or equal to 1.5 T and more preferably less than or equal to 1.0 T. The thickness $t_5$ between the circumferential relief part 34b and the outer circumferential surface 26c of the rotor core 26 is about 1.0 T. Also, the rigidity of the rotor core 26 can be enhanced by making the outer circumferential surface 26c into a circular continuous surface.

Since the magnet holding section 26b has the circumferential relief parts 34a and the circumferential relief parts 34b, the interference of corners (edge portions) of the θ magnet 28 with the magnet holding section 26b, which may otherwise occur when the θ magnets 28 are inserted to the rotor core 26, is suppressed. Accordingly, the degree of freedom in the shape of the θ magnets 28, particularly the shape of the corners, increases, thereby improving the operability when the θ magnets 28 are to be inserted into the magnet holding sections 26b even though the θ magnets 28 have no R faces or C faces. Also, invalid magnetic fluxes, heading toward the opposite principal surface 28b passing through within the rotor core 26, among the fluxes emanating from the principal surface 28a of each θ magnet 28 are blocked by the circumferential relief parts 34a and 34b, which are filled with air whose relative magnetic permeability is low. Hence, the occurrence of short-circuiting (magnetic short-circuiting) inside the rotor core 26 is suppressed.

At the same time, parts of the principal surfaces 28a and 28b having the magnetic poles of the magnet 28 do not come in contact with the rotor core 26 because of the circumferential relief parts 34a and 34b. As a result, it is possible that valid magnetic fluxes, which leave the principal surface 28a of the θ magnet 28 and then enter the principal surface 28b by way of the gap, will be reduced. However, a sintered magnet having a high residual magnetic flux density can be used as the θ magnet 28 even though the magnet does not have the C face (inclined plane) or R face in the corner. Thus, a desired average magnetic flux density for the rotor 12 can be achieved.

Suppose that the shortest distance between the adjacent θ magnets 28 is denoted by Wb [mm] (see FIG. 5B). Then, Wb is so set as to satisfy Wb≤7T and more preferably Wb≤5T. If the shortest distance between the adjacent θ magnets 28 is large, the invalid magnetic fluxes inside the rotor core 26 resulting from the magnetic short-circuiting will increase and therefore valid magnetic fluxes at the gap between the rotor 12 and the stator 14 will tend to drop. In the light of this, the drop in the valid magnetic fluxes (i.e., the average magnetic flux density in the outer circumferential part of the rotor 12) can be suppressed when the shortest distance between the adjacent magnets is so designed as to satisfy the aforementioned inequalities.

[Stator]

Figure 7:
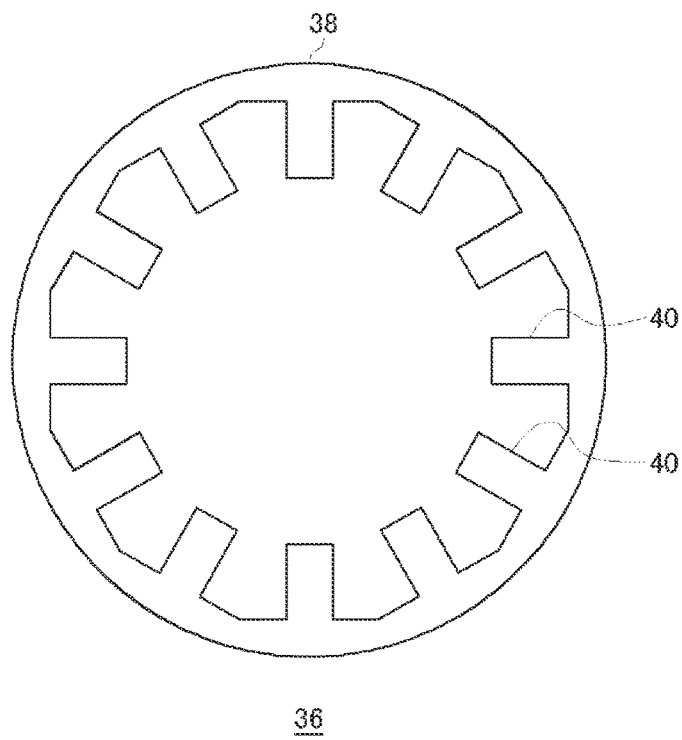
FIG. 7 is a top view of a stator core.
Figure 8:
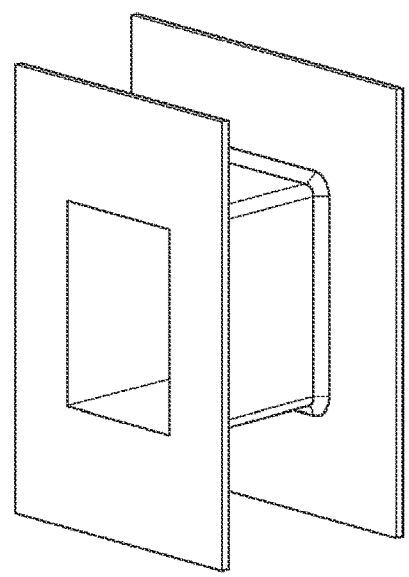
FIG. 8 is a perspective view of an insulator around which a winding is wound.
Figure 9A:
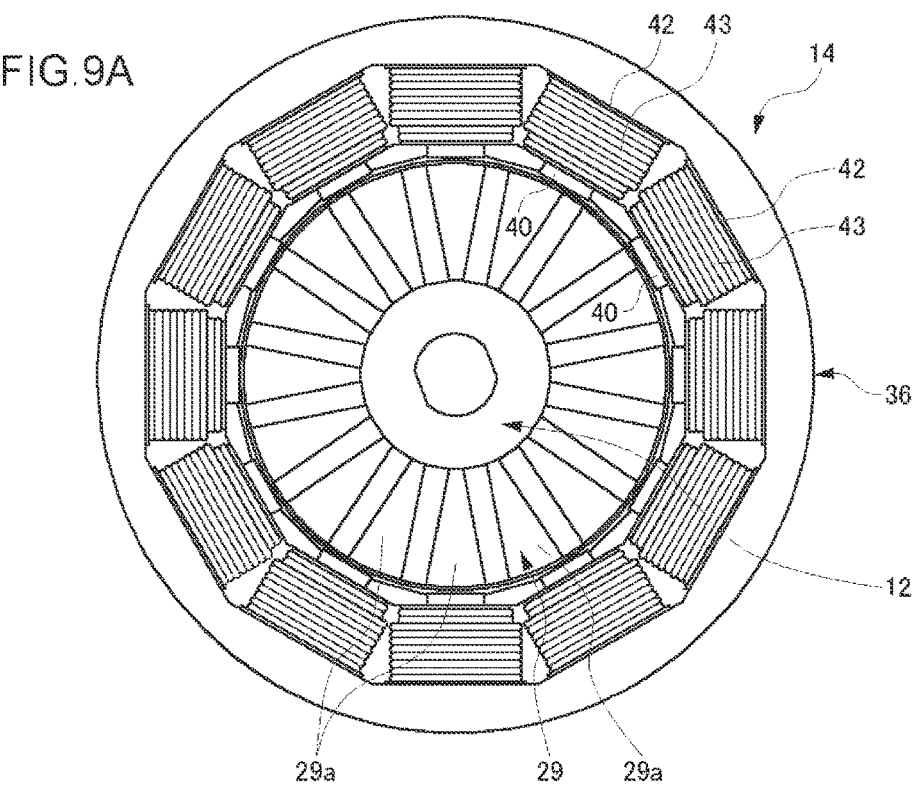
FIG. 9A is a top view of a stator and a rotor according to a first embodiment.
Figure 9B:
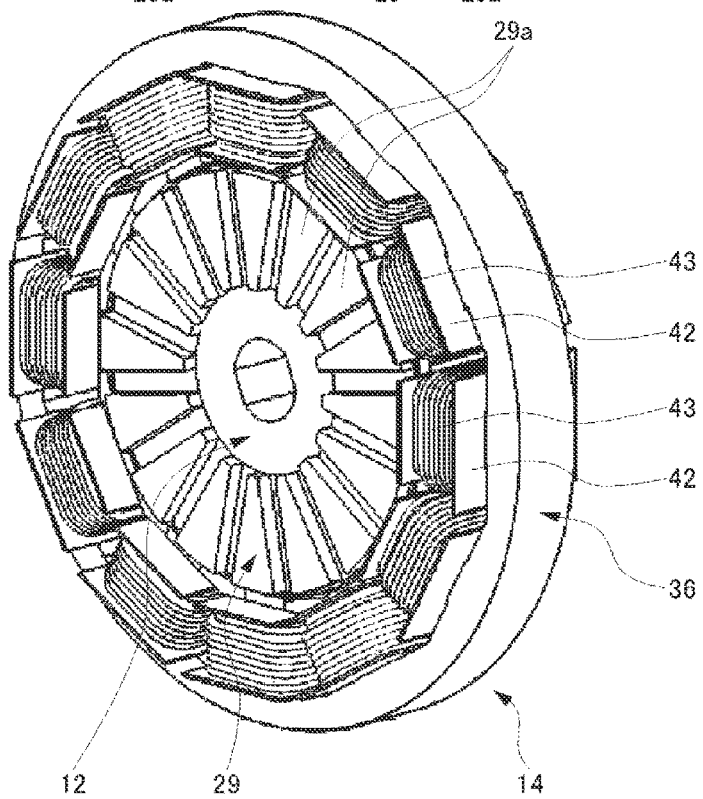
FIG. 9B is a perspective view of a stator and a rotor according to a first embodiment.

A structure of the stator 14 is now described. FIG. 7 is a top view of a stator core. FIG. 8 is a perspective view of an insulator around which a winding is wound. FIG. 9A is a top view of a stator and a rotor according to the first embodiment. FIG. 9B is a perspective view of the stator and the rotor according to the first embodiment.

A stator core 36 is a cylindrical member in which a plurality of plate-like stator yokes 38 are laminated. The stator yoke 38 is configured such that a plurality (e.g., twelve in the present embodiment) of teeth 40 are formed from an inner circumference of a circular portion (annular portion) toward a center.

An integrated-type insulator 42 as shown in FIG. 8 is attached to each of the teeth 40. Then, a conductor is wound around the insulator 42 for each of the teeth 40 so as to form a stator winding 43. Then, as shown in FIGS. 9A and 9B, the rotor 12 is placed in a central part of the stator 14 that has been completed through the above processes. Note that if the tooth 40 is configured such that the width of the tooth 40 gets wider toward the tip thereof, a plurality of divided insulators may be attached from top and bottom of the teeth 40.

[The Number of θ Magnets and the Shape Thereof]

When an IPM brushless motor of an inner rotor type like the motor 100 according to the present embodiment is used, the number of θ magnets 28 and the shape thereof can be selected in a way depending on the size of the rotor core 26. Note that randomly selecting the number of θ magnets 28 and the shape thereof only does not achieve a highly efficient (e.g., high torque) motor.

In the light of this, the inventor of the present invention has come to recognize the following point through diligent investigations. That is, optimizing the number of θ magnets 28 (i.e., the number P of magnetic poles of the rotor 12) and the thickness Lm (mm) of the θ magnets 28 in a circumferential direction of the rotor core 26, relative to the diameter Dr [mm] of the rotor core 26, can improve an average magnetic flux density Bg in the outer circumferential part of the rotor 12 relative to a residual magnetic flux density Br of the θ magnets 28.

Figure 10:
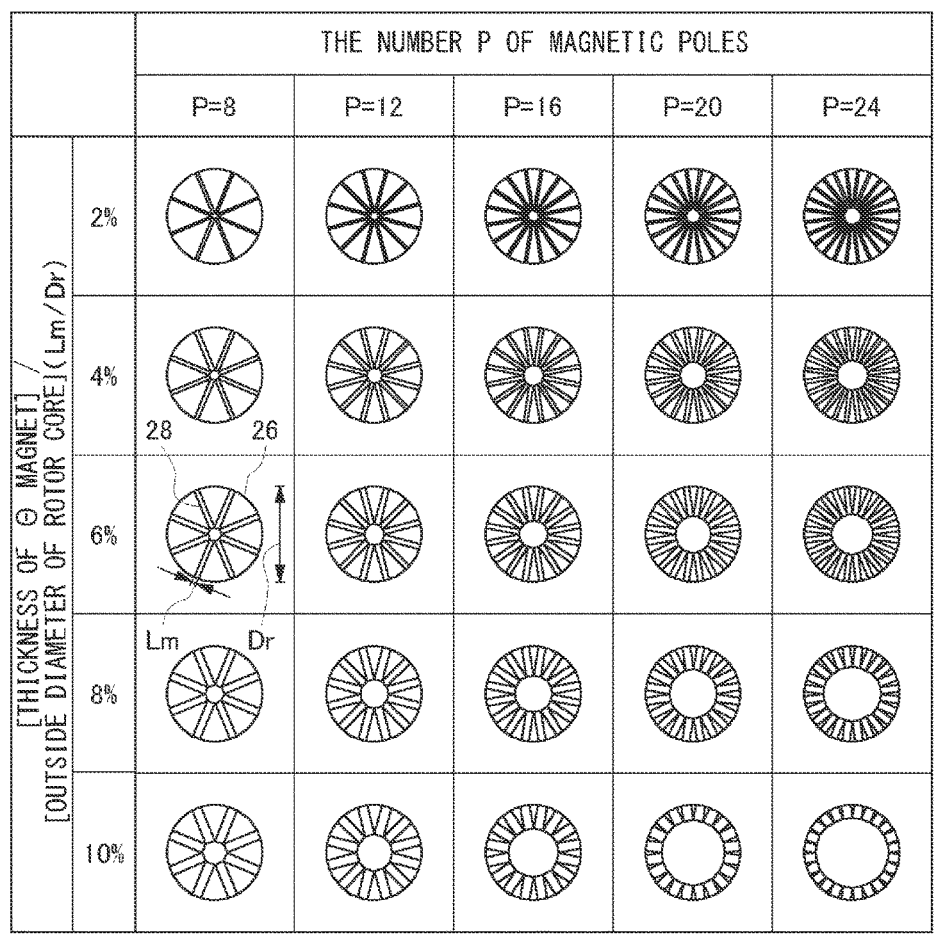
FIG. 10 schematically lists the arrangements of magnets of a rotor corresponding to the number P of magnetic poles and the ratio (Lm/Dr) of the thickness (Lm[mm]) of a θ magnet over the outside diameter (Dr[mm]) of a rotor core.

A description is given hereunder of analysis results obtained in simulation runs and the like. FIG. 10 schematically lists the arrangements of magnets of a rotor corresponding to the number P of magnetic poles and the ratio (Lm/Dr) of the thickness (Lm[mm]) of the θ magnet over the outside diameter (Dr[mm]) of a rotor core. Assume that the θ magnets 28 are arranged in the rotor core 26 of a predetermined size. Then, as shown in FIG. 10, the larger the number of θ magnets 28 (the number P of magnetic poles thereof) is, the less the length of the θ magnet 28 in a radial direction of the rotor core becomes in order to avoid the interference between the adjacent θ magnets 28. That is, the area of a principal surface of the θ magnet 28 having a magnetic pole thereof becomes smaller.

For the same number of magnetic poles, as shown in FIG. 10, the greater the thickness Lm of the θ magnet 28 in a radial direction of the rotor core is, the less the length of the θ magnet 28 in a radial direction of the rotor core becomes in order to avoid the interference between the adjacent θ magnets 28. That is, the area of a principal surface of the θ magnet 28 having a magnetic pole thereof becomes smaller.

Thus, the inventor of the present invention had analyzed how the magnetic flux density in the outer circumferential part of each rotor configured as shown in FIG. 10 (i.e., in a gap between a rotor and a stator) varies with the change in the number P of magnetic poles and the ratio (Lm/Dr) of the thickness Lm of a θ magnet to the outside diameter Dr of a rotor core. More specifically, analysis is conducted for the cases where the numbers P of magnetic poles are 8, 12, 16, 20 and 24 and the ratio (Lm/Dr) of the thickness Lm of the θ magnet to the outside diameter Dr of the rotor core varies in a range of 2% to 24%.

Figure 11:
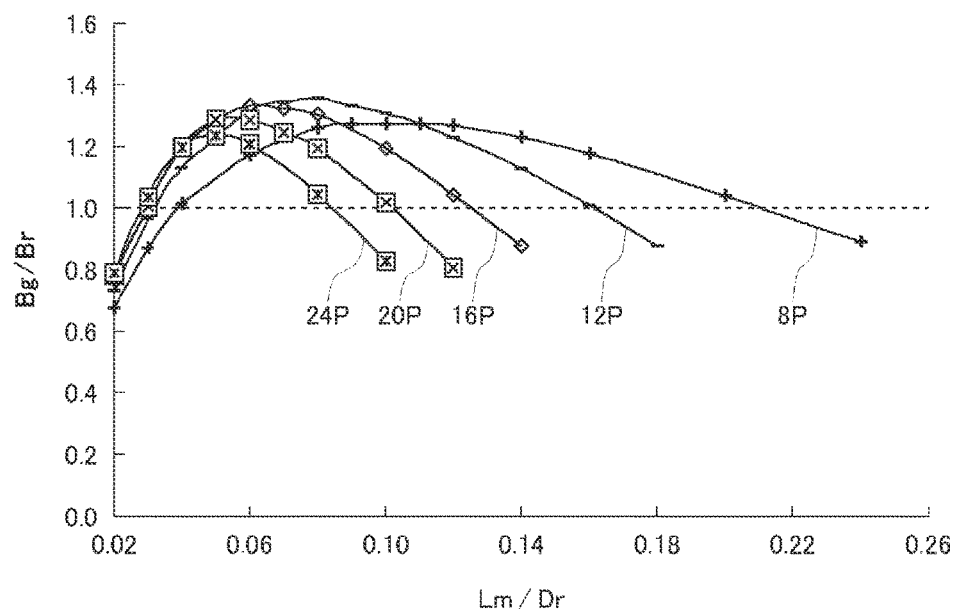
FIG. 11 is a graph showing a relation, for each of the number of magnetic poles, between the ratio (Lm/Dr) of the thickness of a θ magnet to the outside diameter of a rotor core and an average magnetic flux density Bg in a gap.

FIG. 11 is a graph showing a relation, for each of the number of magnetic poles, between the ratio (Lm/Dr) of the thickness Lm of a θ magnet to the outside diameter Dr of a rotor core and the average magnetic flux density Bg in said gap. In the vertical axis of FIG. 11, the magnetic flux density in said gap is normalized by dividing it by the residual magnetic flux density Br. Also, the residual magnetic flux density Br used in the analysis is set to 1 [T], and the width of said gap is 1% of the outside diameter Dr.

As evident from FIG. 11, for any given number P of magnetic poles, as the value of Lm/Dr increases from 2%, the value of Bg/Br increases, too; thereafter, the value of Bg/Br reaches a peak value; and, thereafter, as the value of Lm/Dr further increases passing the peak value, the value of Bg/Br goes into decline. This is considered attributable to the following reason. As listed in FIG. 10, for the same number of magnetic poles, as the thickness Lm of the θ magnet increases, the length thereof in a radial direction of the rotor core must be reduced in order to avoid the interference between the θ magnets 28. As a result, the area of a principal surface of the θ magnet having a magnetic pole thereof is reduced.

It is verified from the above analysis results that, in a range for which Bg/Br>1.0, the average magnetic flux density Bg in the gap between the rotor and the stator is higher than the residual magnetic flux density Br of the θ magnet and therefore the value of Lm/Dr is preferably in its range for which Bg/Br>1.0 holds.

Figure 12:
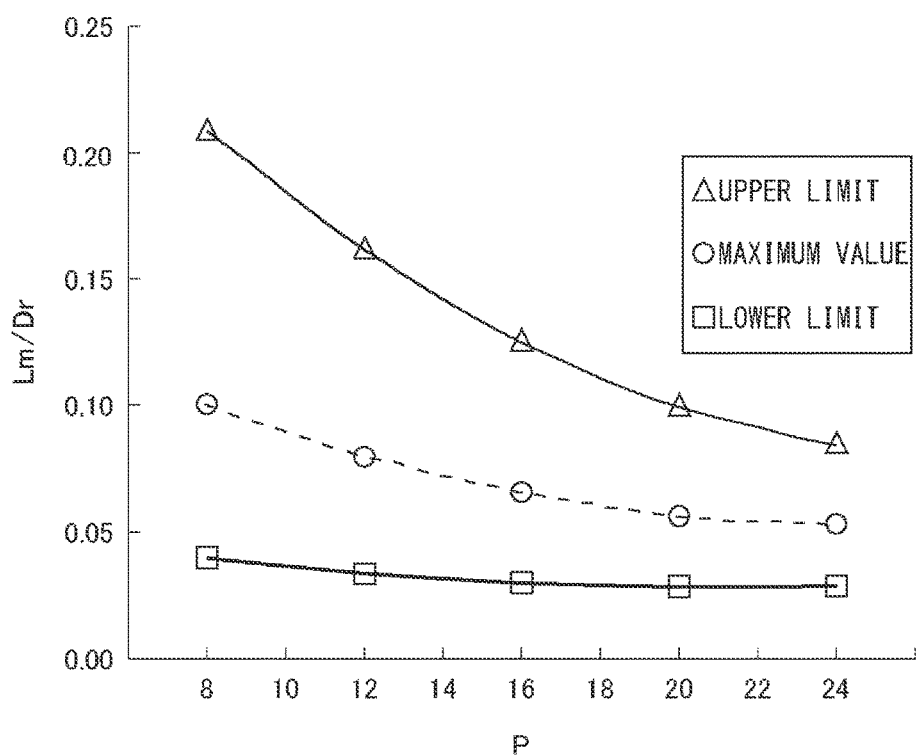
FIG. 12 is a graph showing a relation between the number P of magnetic poles and the ratio (Lm/Dr) of the thickness Lm of a θ magnet to the outside diameter Dr of a rotor core for which Bg/Br>1.0.

FIG. 12 is a graph showing a relation between the number P of magnetic poles and the ratio (Lm/Dr) of the thickness Lm of a θ magnet to the outside diameter Dr of a rotor core for which Bg/Br>1.0. That is, FIG. 12 shows an upper limit and a lower limit in the range of Lm/Dr for which Bg/Br>1.0 in a convex curve of FIG. 11 for each of the number P of magnetic poles. Also, a maximum value is a value of Lm/Dr for which the value of Bg/Br assumes the maximum (peak) value.

Thus, the number P of magnetic poles and the ratio (Lm/Dr) of the thickness Lm of the θ magnet to the outside diameter Dr of the rotor core are selected so as to lie between a curve connecting the upper limits (triangular points) of FIG. 12 and a curve connecting the lower limits (square points) of FIG. 12. As a result, the average magnetic flux density in the outer circumferential part of the rotor of the motor can be raised.

More specifically, approximation formulae for a curve connecting the upper limits and a curve connecting the lower limits are calculated where the outside diameter of the rotor core is denoted by Dr [mm] and the thickness of the θ magnets in the circumferential direction of the rotor core is denoted by Lm [mm]. As a result, the number of θ magnets 28 and the shape thereof may be preferably so determined and constructed as to satisfy the following inequalities, for instance.

$$0.665 \times 10^{-4} \times P^2 - 0.28 \times 10^{-2} \times P + 0.577 \times 10^{-1} < (Lm/Dr)$$
$$< 3.38 \times 10^{-4} \times P^2 - 1.86 \times 10^{-2} \times P + 3.36 \times 10^{-1}$$

In consideration of the maximum value of Bg/Br in each of the number of magnetic poles shown in FIG. 11, the number P of magnetic poles of the rotor may be any one of 12 poles, 14 poles, 16 poles, 18 poles and 20 poles. If such a number of magnetic poles is used, the average magnetic flux density Bg in the outer circumferential part of the rotor 12 can be increased at least about 1.3 times the residual magnetic flux density Br of the θ magnet 28.

Here, the outside diameter of the rotor core 26 (the rotor 12) may be 35 mm to 200 mm, for instance. Also, the diameter of the through-hole 26a of the rotor core 26, namely the diameter of the rotating shaft 24, may be 5 mm to 40 mm, for instance. Also, if the θ magnet 28 is an approximately rectangular parallelepiped, the size of the θ magnet 28 may be set, for instance, such that the thickness thereof in the circumferential directions θ of the rotor core 26 is 1 mm to 25 mm, the width thereof in the radial direction r of the rotor core 26 is 5 mm to 80 mm, and the length thereof in a direction of the rotating shaft of the rotor is 8 mm to 32 mm. Also, the thickness of a single electromagnetic steel sheet may be 0.2 mm to 1.0 mm, for instance. Also, the magnetic property of the θ magnet 28 may be such that the residual magnetic flux density Br is 0.4 T to 1.5 T, for instance, and a holding force Hcb is 320 kA/m to 1200 kA/m, for instance.

Second Embodiment

Figure 13A:
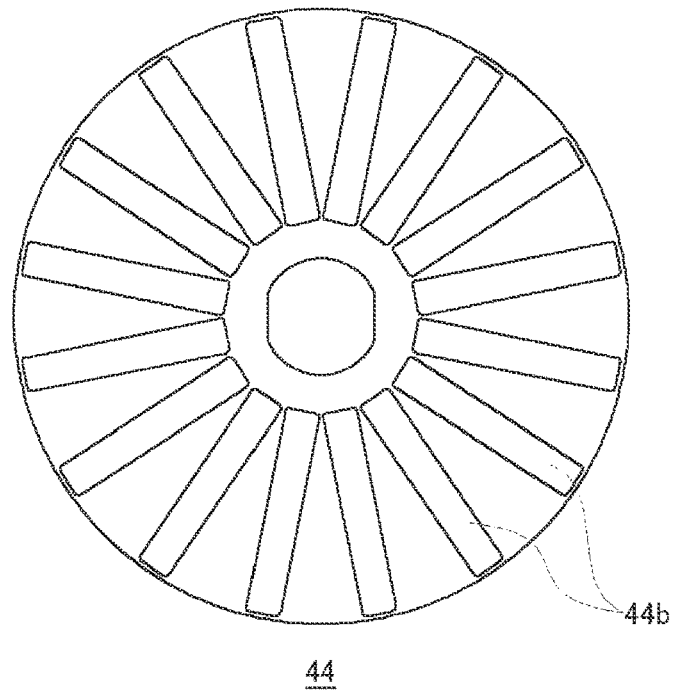
FIG. 13A is a top view of a rotor core, according to a second embodiment, without having the relief parts.
Figure 13B:
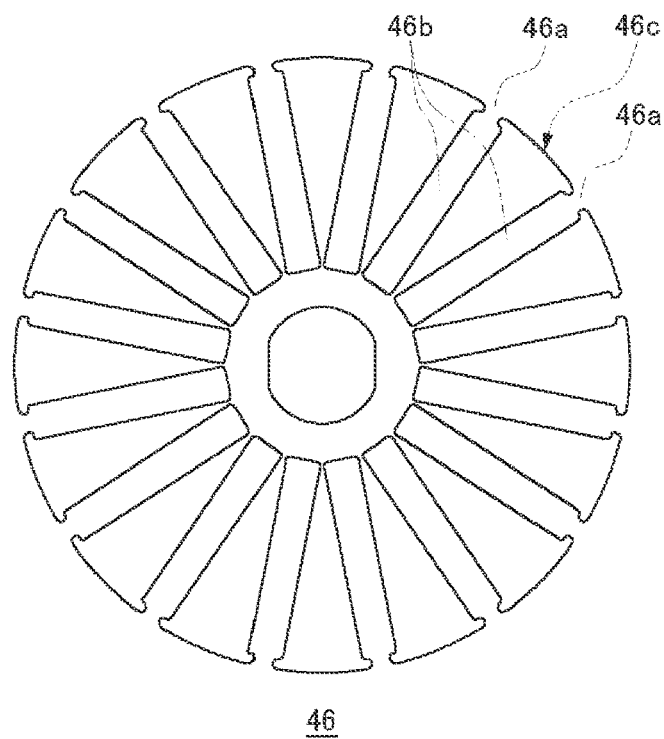
FIG. 13B is a top view of a rotor core, according to a second embodiment, wherein no relief parts is provided and the outer periphery is disconnected.

A modification of the rotor core will be described in each of the following embodiments. FIG. 13A is a top view of a rotor core, according to a second embodiment, without having the relief parts. FIG. 13B is a top view of a rotor core, according to the second embodiment, wherein no relief parts is provided and the outer periphery is disconnected.

Similar to the rotor core 26 of the first embodiment, a rotor core 44 shown in FIG. FIG. 13A has a plurality of magnet holding sections 44b that are fixed by inserting the θ magnets thereinto. Unlike the rotor core 26 of the first embodiment, the magnet holding section 44b does not have the relief parts.

Accordingly, there is no need to take into account the interference, between the circumferential relief parts 34a, as with the rotor core 26 both in the radial direction of the rotor core in the magnet holding section 44b and in the center-side of the rotor core in the magnet holding section 44b. Thus, the magnet holding section 44b can be extended toward the radial direction of the rotor core. In other words, the θ magnet 28 whose length in the radial direction of the rotor core is larger can be received and held, so that the valid magnetic fluxes in a principal surface of a θ magnet 28 (i.e., a surface having a magnetic pole) can be raised (namely, the torque can be raised). Also, since no relief parts is provided, no hollow spaces will be created on a principal surface side of the θ magnet 28 held by the magnet holding section 44b. Hence, a reduction in the valid magnetic fluxes heading toward the outer circumferential part of the rotor core 26 is avoided.

For the magnet holding section 44b having no relief parts, the operability when the θ magnets 28 are to be inserted into the magnet holding sections 26b can be improved if the θ magnets 28 having C faces and R faces in the corners are used. In such a case, the bonded magnets where C faces and R faces can be formed in the corners during the molding without the preprocessing may preferably be used for the θ magnets 28. However, the sintered magnets may be used for the θ magnets 28 if the C faces and R faces can be formed in the corners.

The rotor core 46 shown in FIG. 13B has a plurality of magnet holding sections 46b. Although, unlike the rotor core 26 according to the first embodiment, the magnet holding section 46b has no relief parts, the magnet holding section 46b has cut sections 46a on an outer circumference surface 46c in a radial direction of the rotor core. Hence, the occurrence of magnetic short-circuiting in an outer circumferential part of the rotor core 46 is suppressed.

Third Embodiment

Figure 14A:
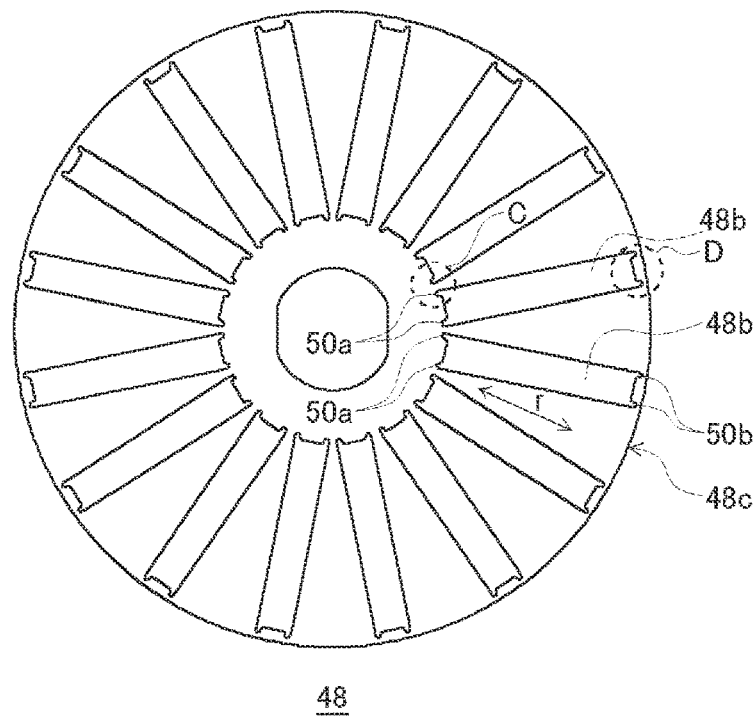
FIG. 14A is a top view of a rotor core according to a third embodiment.
Figure 14B:
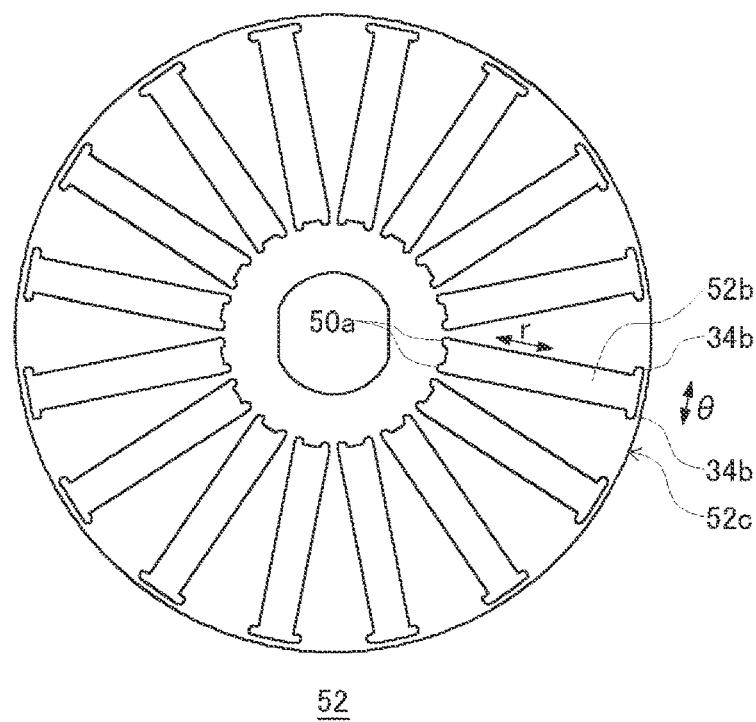
FIG. 14B is a top view of a rotor core according to a modification of a third embodiment.
Figure 15A:
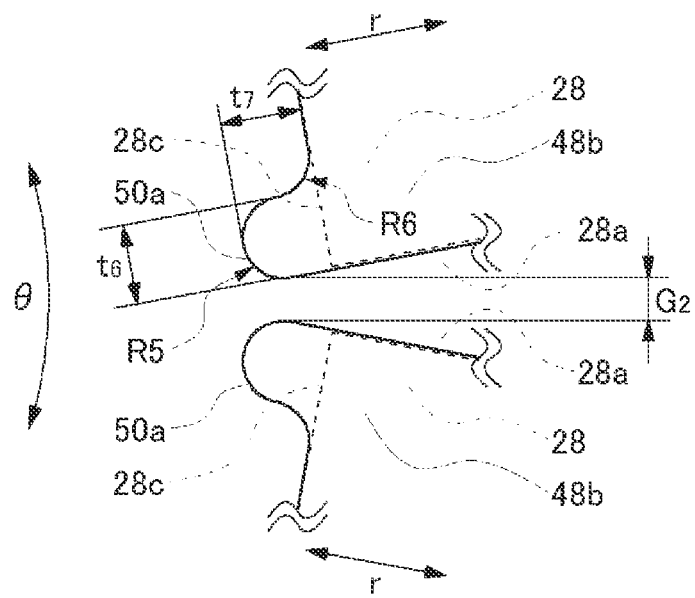
FIG. 15A is an enlarged view of region C in FIG. 14A.
Figure 15B:
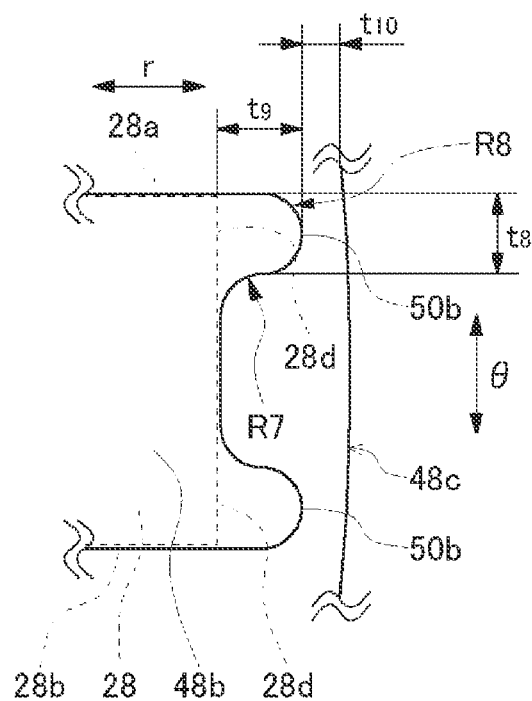
FIG. 15B is an enlarged view of region D in FIG. 14A.

FIG. 14A is a top view of a rotor core according to a third embodiment. FIG. 14B is a top view of a rotor core according to a modification of the third embodiment. FIG. 15A is an enlarged view of region C in FIG. 14A. FIG. 15B is an enlarged view of region D in FIG. 14A.

A rotor core 48 shown in FIG. 14A has a plurality of magnet holding sections 48b formed radially. The magnet holding section 48b has radial relief parts 50a formed in a radial direction r of the rotor core 48 and in a center-side end of the rotor core 48. Here, the radial relief parts 50a form gaps when the θ magnet 28 is contained in and held by the magnet holding section 48b. The radial relief part 50a is coplanar with a principal surface 28a (28b) having a magnetic pole of the θ magnet 28 contained in the magnet holding section 48b. Also, the radial relief parts 50a are provided such that they extend toward the center of the rotor core 48 from a center-side end face 28c of the rotor core of the θ magnet 28 contained in the magnet holding section 48b.

Suppose that the thickness of a single electromagnetic steel sheet that constitutes the rotor core 48 is denoted by T [mm]. Then the dimensions of the radial relief part 50a are so set as to satisfy the following inequalities. That is, the thickness $t_6$ of the radial relief part 50a in the circumferential directions θ is set such that $t_6 \leq 3T$ and more preferably $t_6 \leq 2T$, and the thickness $t_7$ thereof in the radial direction r is set such that $t_7 \leq 3T$ and more preferably $t_7 \leq 2T$. Also, the diameters of an R5 face and an R6 face of the radial relief part 50a are each less than or equal to 1.5 T and more preferably less than or equal to 1.0 T. Also, an interval $G_2$ between adjacent radial relief parts 50a is about 1.0 T.

Also, the magnet holding section 48*b* has radial relief parts 50*b* formed in the radial direction r of the rotor core 48 and in an end opposite to the center side of the rotor core 48. Here, the radial relief parts 50*b* form gaps when the θ magnet 28 is contained in and held by the magnet holding section 48*b*. The radial relief parts 50*a* are coplanar with the principal surfaces 28*a* and 28*b* having the magnetic poles of the θ magnet 28 contained in the magnet holding section 48*b*. Also, the radial relief parts 50*b* are provided such that they extend toward an outer circumferential surface 48*c* of the rotor core 48 from an end face 28*d* opposite to the center side of the rotor core of the θ magnet 28 contained in the magnet holding section 48*b*.

The dimensions of the radial relief part 50*b* are so set as to satisfy the following inequalities. That is, the thickness $t_8$ of the radial relief part 50*b* in the circumferential directions θ is set such that $t_8 \leq 3T$ and more preferably $t_8 \leq 2T$, and the thickness $t_9$ thereof in the radial direction r is set such that $t_9 \leq 3T$ and more preferably $t_9 \leq 2T$. Also, the diameters of an R7 face and an R8 face of the radial relief part 50*b* are each less than or equal to 1.5 T and more preferably less than or equal to 1.0 T. The thickness $t_{10}$ between the radial relief part 50*b* and the outer circumferential surface 48*c* of the rotor core 48 is about 1.0 T.

Since the magnet holding section 48*b* has the radial relief parts 50*a* and the radial relief parts 50*b*, the interference of corners (edge portions) of the θ magnet 28 with the magnet holding section 48*b*, which may otherwise occur when the θ magnets 28 are inserted to the rotor core 48, is suppressed. Accordingly, the degree of freedom in the shape of the θ magnets 28, particularly the shape of the corners, increases, thereby improving the operability when the θ magnets 28 are to be inserted into the magnet holding sections 48*b* even though the θ magnets 28 have no R faces or C faces. Also, invalid magnetic fluxes, heading toward the opposite principal surface 28*b* passing through within the rotor core 48, among the fluxes emanating from the principal surface 28*a* of each θ magnet 28 are blocked by the radial relief parts 50*a* and 50*b*, which are filled with air whose relative magnetic permeability is low. Hence, the occurrence of short-circuiting (magnetic short-circuiting) inside the rotor core 48 is suppressed.

At the same time, because of the radial relief parts 50*a* and 50*b*, it is possible that valid magnetic fluxes, which leave the principal surface 28*a* of the θ magnet 28 and then enter the principal surface 28*b* by way of the gap, will be reduced. However, a sintered magnet having a high residual magnetic flux density can be used as the θ magnet 28 even though the magnet does not have the C face (inclined plane) or R face in the corner. Thus, a desired average magnetic flux density for the rotor can be achieved.

For the rotor core 48, there is no need to take into account the interference, between the circumferential relief parts 34*a*, as with the rotor core 26 both in the radial direction of the rotor core 48 in the magnet holding section 48*b* and in the center-side of the rotor core in the magnet holding section 48*b*. Thus, the magnet holding section 48*b* can be extended toward the radial direction of the rotor core. In other words, the θ magnet 28 whose length in the radial direction of the rotor core is larger can be received and held, so that the valid magnetic fluxes in a principal surface of a θ magnet 28 (i.e., a surface having a magnetic pole) can be raised (namely, the torque can be raised). Also, since no circumferential relief parts is provided, no hollow spaces will be created on a principal surface side of the θ magnet 28 held by the magnet holding section 48*b*. Hence, a reduction in the valid magnetic fluxes heading toward the outer circumferential part of the rotor core 48 is avoided.

A rotor core 52 shown in FIG. 14B is a modification of the rotor core 48 shown in FIG. 14A. The rotor core 52 has a plurality of magnet holding sections 52*b* formed radially. The magnet holding section 52*b* has the radial relief parts 50*a* formed in the radial direction r of the rotor core 52 and in a center-side end of the rotor core 52. Here, the radial relief parts 50*a* form gaps when the θ magnet 28 is contained in and held by the magnet holding section 52*b*.

Also, similar to the rotor core 26, the magnet holding section 52*b* has the circumferential relief parts 34*b* formed in the radial direction r of the rotor core 52 and in an end opposite to the center side of the rotor core 52. Here, the circumferential relief parts 34*b* form gaps when the θ magnet 28 is contained in and held by the magnet holding section 52*b*. The operation performed by and the effects achieved by the rotor core 52 are similar to those described in each of the above-described embodiments and therefore the repeated description thereof is omitted here.

Fourth Embodiment

Figure 16A:
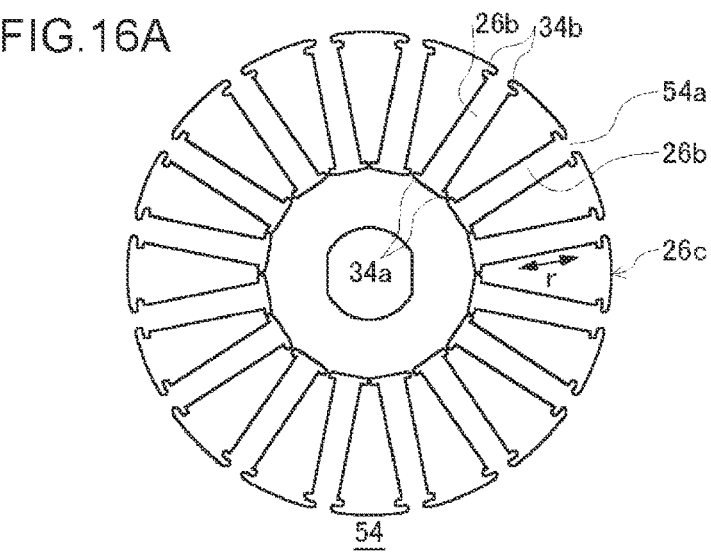
FIG. 16A to FIG. 16C are top views of exemplary rotor cores according to a fourth embodiment.
Figure 16B:
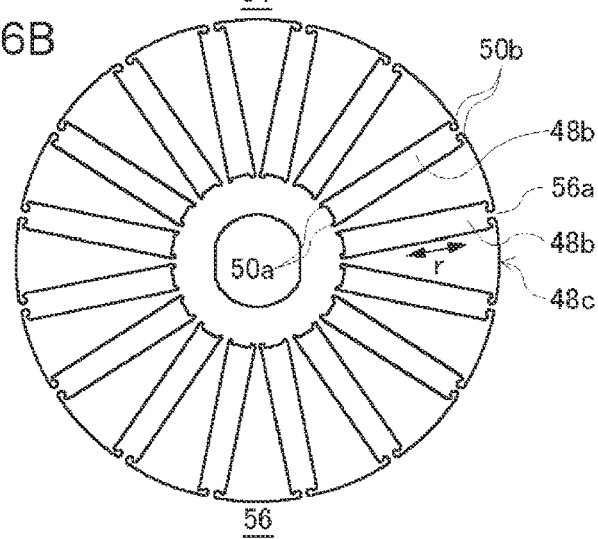
Figure 16C:
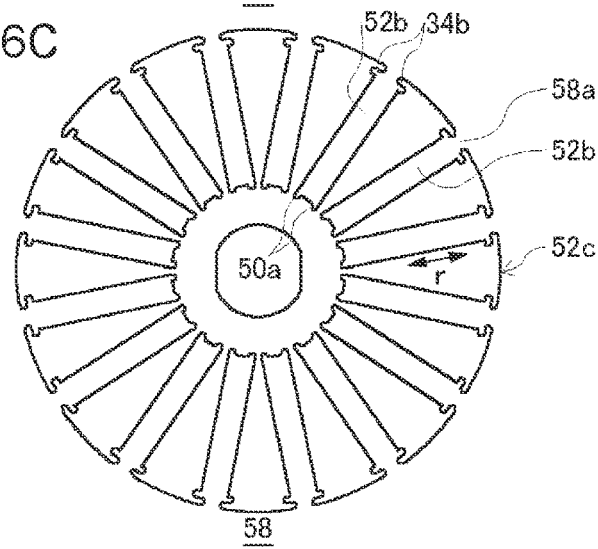

FIG. 16A to FIG. 16C are top views of exemplary rotor cores according to a fourth embodiment.

A rotor core 54 shown in FIG. 16A is one in which a part of the outer circumferential surface 26*c* of the rotor core 26 according to the first embodiment is disconnected or disjoint. As a result, a cut section 54*a*, which communicates with the exterior, is formed at an outer end of the magnet holding section 26*b* in radial directions r of the rotor core.

A rotor core 56 shown in FIG. 16B is one in which a part of the outer circumferential surface 48*c* of the rotor core 48 according to the third embodiment is disconnected or disjoint. As a result, a cut section 56*a*, which communicates with the exterior, is formed at an outer end of the magnet holding section 48*b* in radial directions r of the rotor core.

A rotor core 58 shown in FIG. 16C is one in which a part of an outer circumferential surface 52*c* of the rotor core 52 according to the modification of the third embodiment is disconnected or disjoint. As a result, a cut section 58*a*, which communicates with the exterior, is formed at an outer end of the magnet holding section 52*b* in radial directions r of the rotor core.

As described above, the occurrence of magnetic short-circuiting near the outer circumferential surface of each of the rotor cores 54, 56 and 58 is suppressed. This increases the valid magnetic fluxes directed outward from the outer circumferential surface of the rotor core.

Fifth Embodiment

Figure 17A:
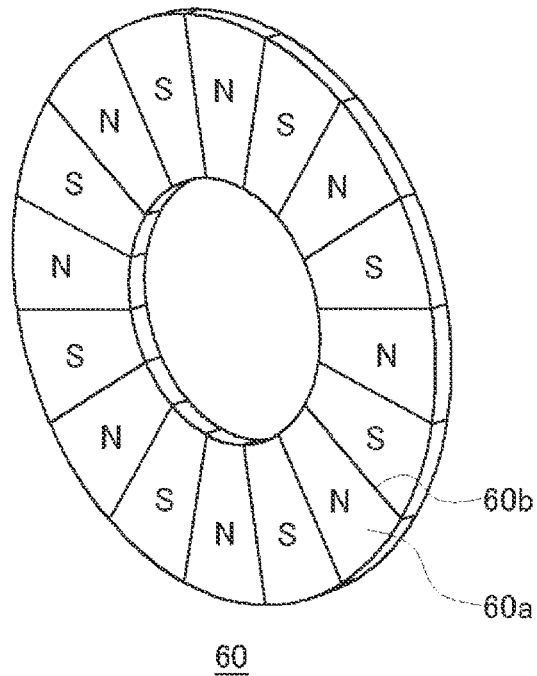
FIG. 17A is a perspective view of Z magnets according to a fifth embodiment.
Figure 17B:
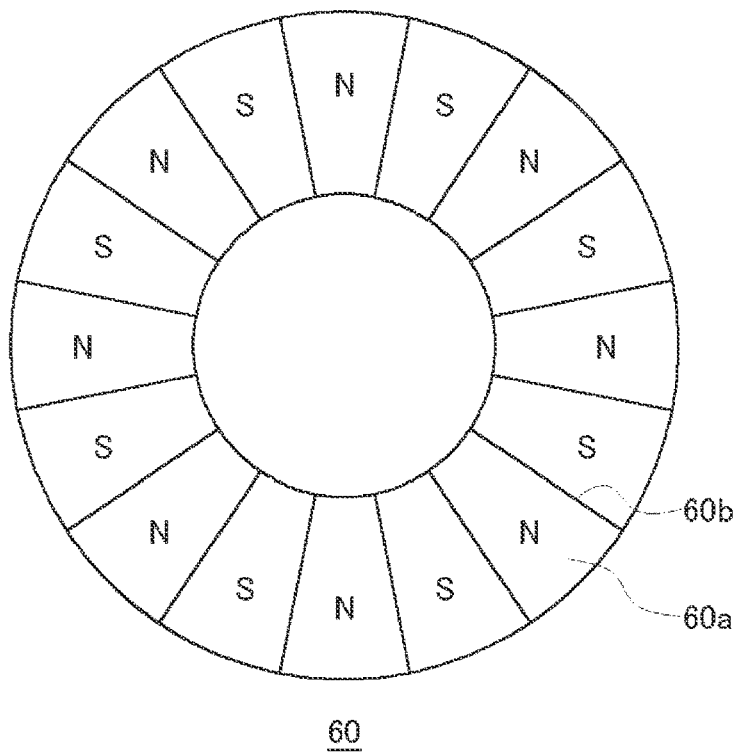
FIG. 17B is a top view of Z magnets according to a fifth embodiment.

FIG. 17A is a perspective view of Z magnets according to a fifth embodiment. FIG. 17B is a top view of the Z magnets according to the fifth embodiment.

The Z magnets 60 according to the fifth embodiment are integrally-formed auxiliary magnets of ring shape. Eight N-poles and eight S-poles are alternately formed circumferentially on annular flat surfaces 60*a* of the Z magnets 60. The surfaces opposite to the flat surfaces 60*a* are formed similarly.

Figure 18A:
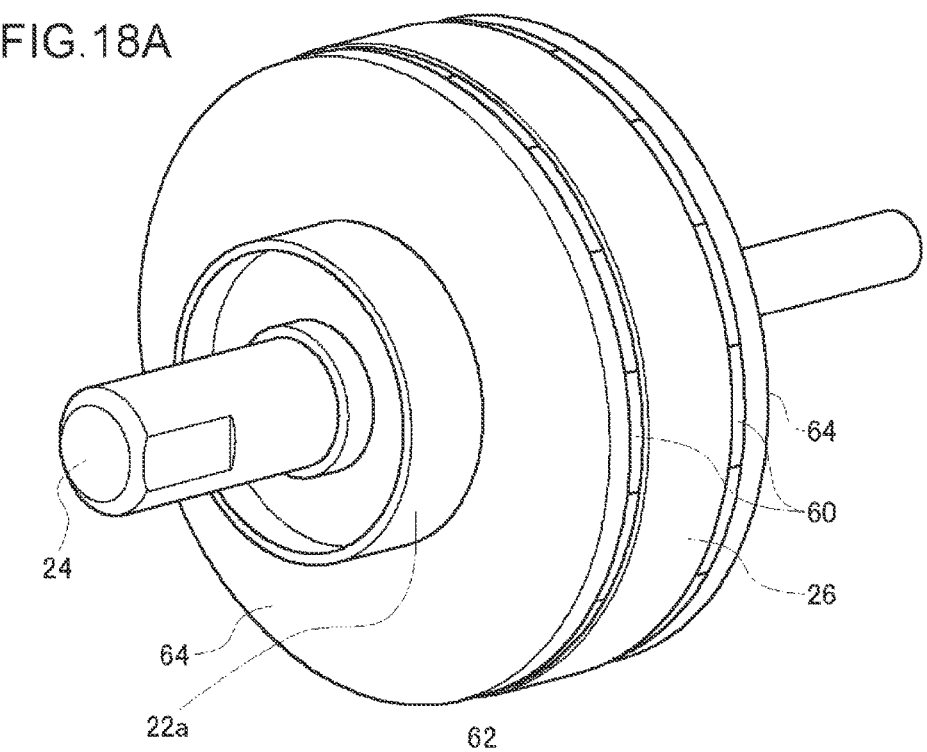
FIG. 18A is a perspective view of a rotor provided with Z magnets according to a fifth embodiment.
Figure 18B:
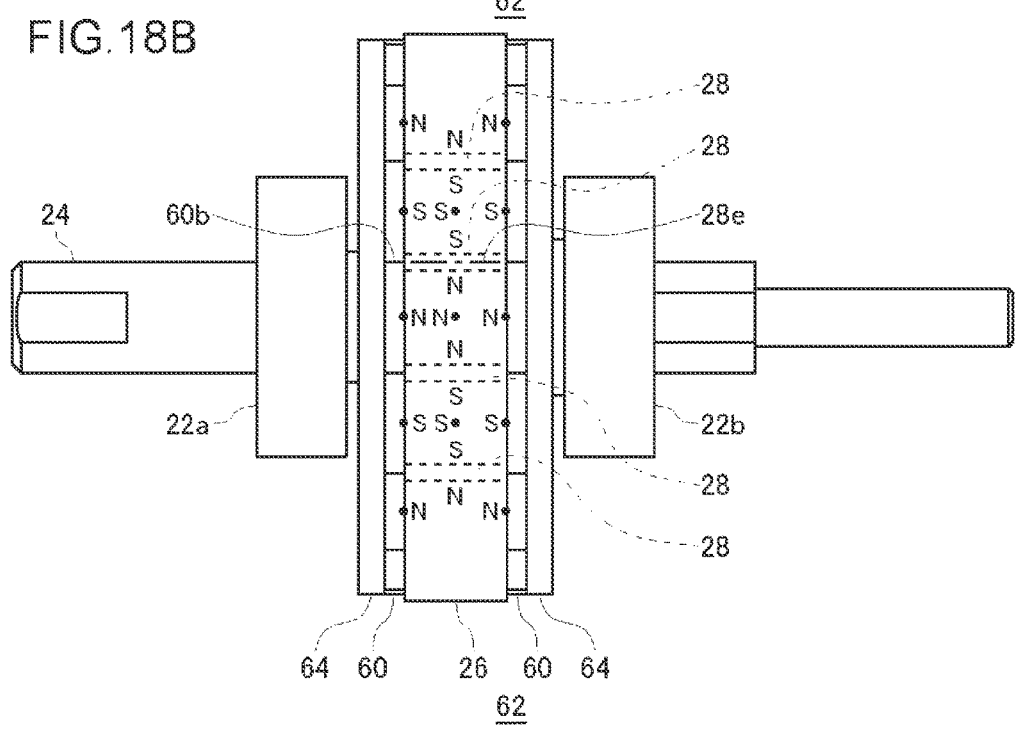
FIG. 18B is a lateral view of a rotor provided with Z magnets according to a fifth embodiment.
Figure 19:
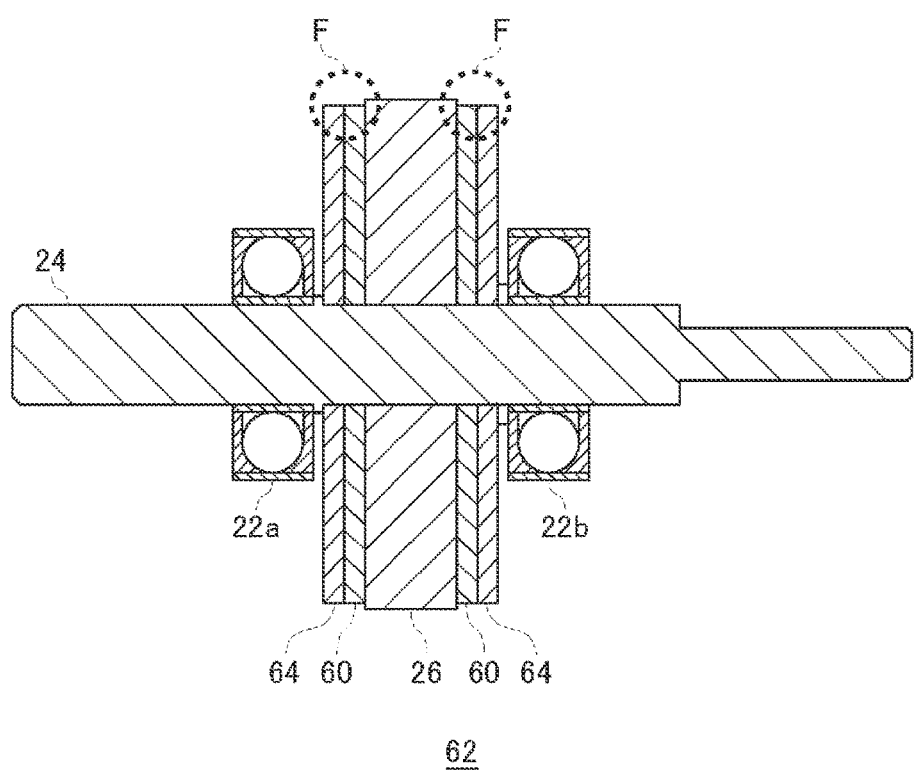
FIG. 19 is a cross-sectional view of the rotor of FIG. 18B cut along a plane including a rotating shaft.

FIG. 18A is a perspective view of a rotor 62 provided with the Z magnets 60 according to the fifth embodiment. FIG. 18B is a lateral view of the rotor 62 provided with the Z magnets 60 according to the fifth embodiment. FIG. 19 is a cross-sectional view of the rotor 62 of FIG. 18B cut along a plane including the rotating shaft 24.

As shown in regions F in FIG. 19, unlike the back yoke 31 shown in FIG. 4B, the surface of a back yoke 64 facing the Z magnets 60 is flat over its entire surface, and no circular catch (thick-walled part) and the like to prevent the scattering of each Z magnet 60 is formed. This is because the rotating shaft 24 penetrates a central part of the Z magnets 60 and therefore there is no chance of the Z magnets scattering.

Sixth Embodiment

In a case where used is a rotor 62 provided with the θ magnets 28 and the Z magnets 60 as with the fifth embodiment, the magnetic pole phase of a θ magnet 28 and the magnetic pole phase of a Z magnet 60 are made to match with each other (see FIG. 18B). This can minimize the flux leakage from the rotor 62 and can maximize the average magnetic flux density in the outer circumferential part of the rotor 62. At the same time, when the magnetic pole phase of a θ magnet 28 and the magnetic pole phase of a Z magnet 60 are made to match with each other, a repulsive force is exerted between the θ magnet 28 and the Z magnet 60. This repulsive force may adversely affect the workability in assembling the rotor. Also, the magnetic flux density inside the θ magnet 28 may drop due to the magnetic force of the Z magnet 60, which in turn may possibly degrade the demagnetization resistance.

In the light of this, the inventor of the present invention analyzes such phenomena through diligent investigations and has come to recognize a point where such a problem can be resolved.

Figure 20:
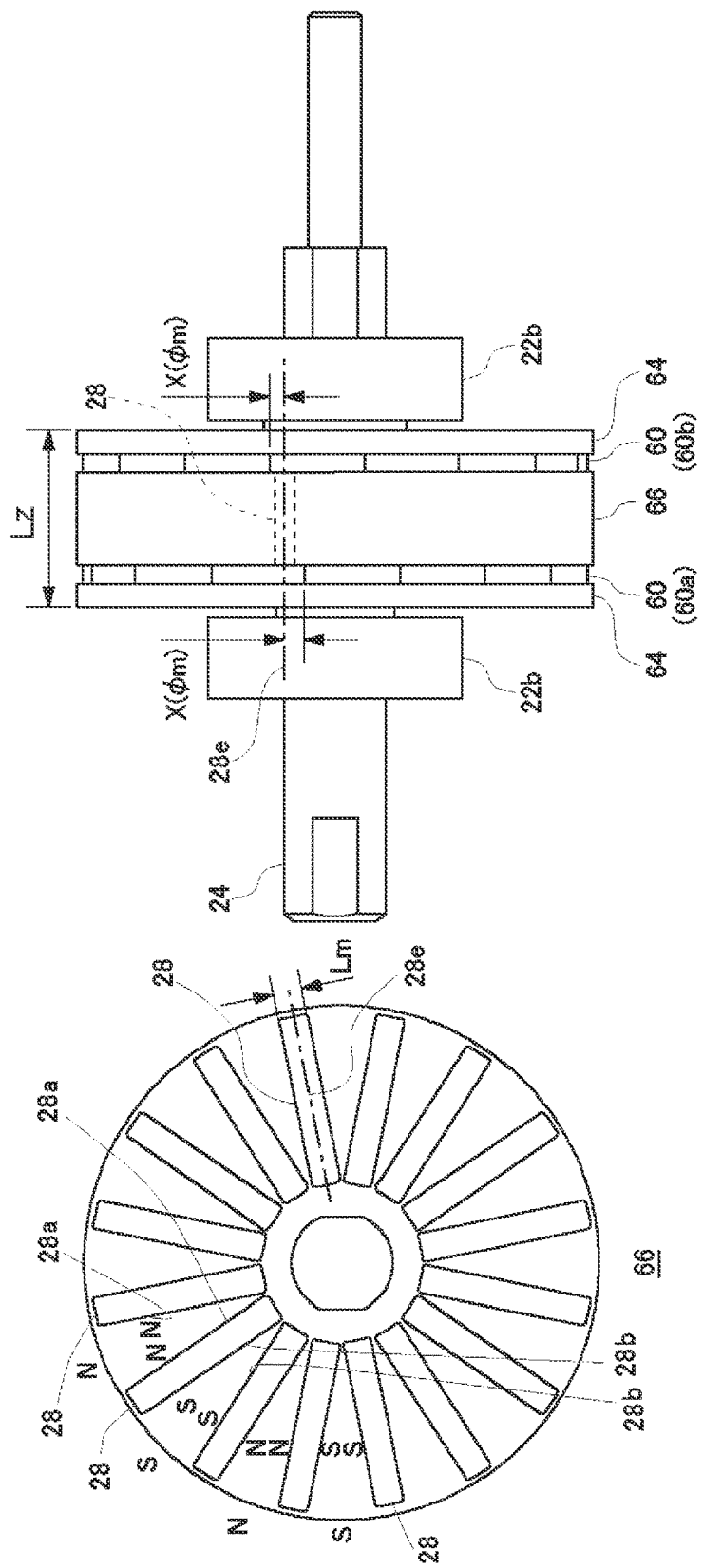
FIG. 20A is a top view to explain the thickness Lm of a θ magnet in a rotor core.
FIG. 20B is a lateral view of a rotor according to a sixth embodiment.

FIG. 20A is a top view to explain the thickness Lm of a θ magnet 28 in a rotor core 66. FIG. 20B is a lateral view of a rotor 68 according to a sixth embodiment.

If, as with the rotor 62 shown in FIG. 18B, the magnetic pole phase of a θ magnet 28 and the magnetic pole phase of a Z magnet 60 are made to match with each other, a boundary 60b of each magnetic pole of a Z magnet 60 will agree with a center line 28e in a thickness direction of a θ magnet 28.

In contrast to this, the Z magnets 60 of the rotor 68 according to the sixth embodiment are provided such that, in a phase in a rotational direction of the rotor core 66, the phase of an N-pole (or an S-pole) of a surface facing the rotor core 66 is shifted relative to the phase of an N-pole (or an S-pole) in the outer circumferential surface of the rotor core 66. In other words, the boundary 60b of each magnetic pole of the Z magnet 60 is located in a position shifted, by a shift length X, relative to the center line 28e in the thickness direction of the θ magnet 28.

Now, simulation analyses were conducted to see how the relation between the shift length X and the torque generated by the rotor changes when the magnetic pole phase of a θ magnet and the magnetic pole phase of a Z magnet are shifted or displaced from each other.

Two rotors each as shown in FIG. 20B are prepared, as the rotors used for simulation models, where a rotor length Lz remains constant regardless of whether the Z magnets and the back yoke are provided or not. More specifically, suppose that two rotors 68 are prepared where one rotor 68 has the rotor length Lz of 17.1 mm with the thickness of the rotor core 66 being 9.1 mm, the thickness of the Z magnets 60 being 2.0 mm and the thickness of the back yoke 64 being 2.0 mm, and the other rotor 68 has the rotor core thickness (the rotor length) of 17.1 mm without the Z magnets and the back yoke.

How many times a torque (average magnetic flux density) T1 generated by the rotor equipped with the Z magnets and the back yoke becomes larger than a torque T2 generated by the rotor having the rotor core only is calculated, depending on the change in the shift length X, using the simulation runs. More specifically, the relation between the torque ratio (T1/T2) and the ratio (X/Lm) of the shift length X to the thickness Lm of θ magnet is shown graphically.

Figure 21:
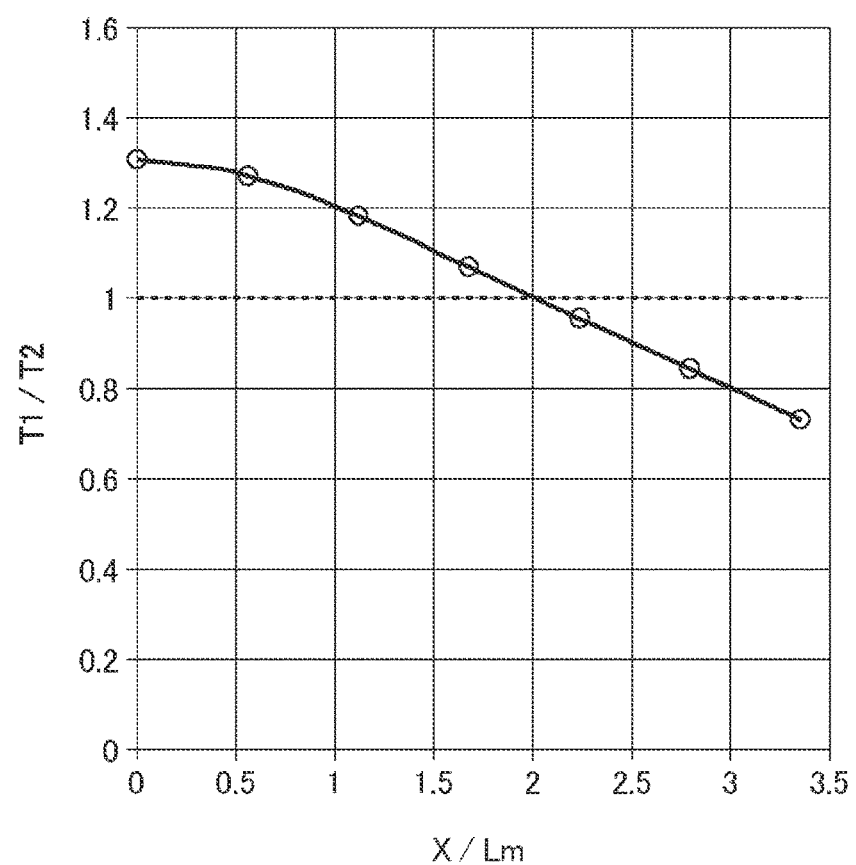
FIG. 21 is a graph showing a relation between T1/T2 and X/Lm, when the number P of magnetic poles of the rotor is 16.
Figure 22:
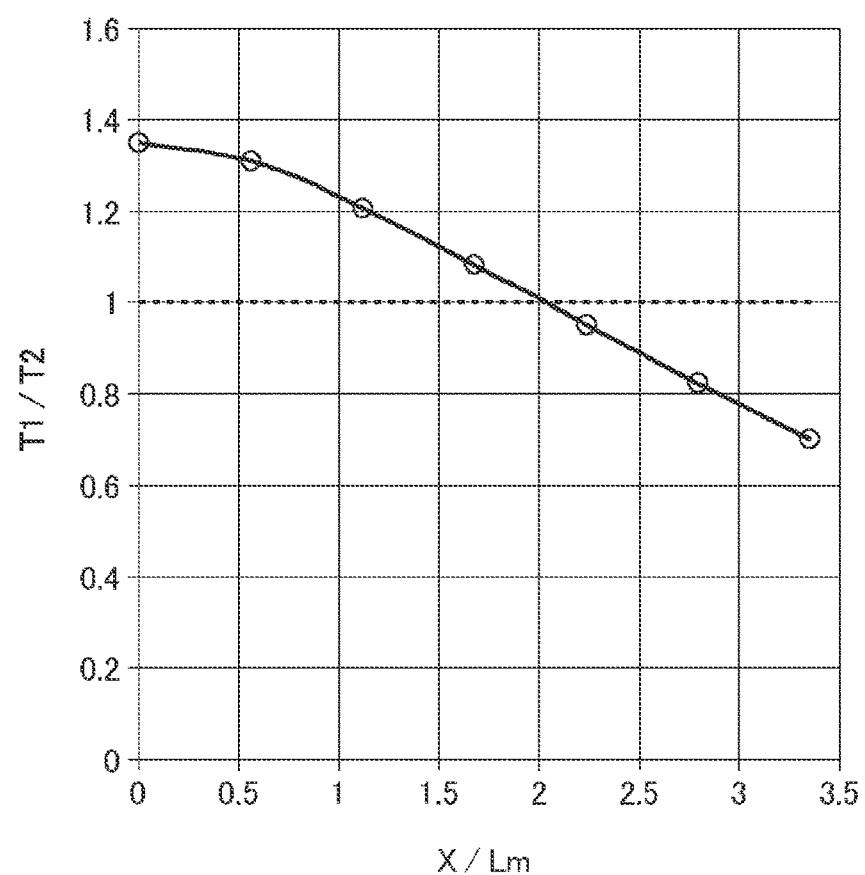
FIG. 22 is a graph showing a relation between T1/T2 and X/Lm, when the number P of magnetic poles of the rotor is 14.
Figure 23:
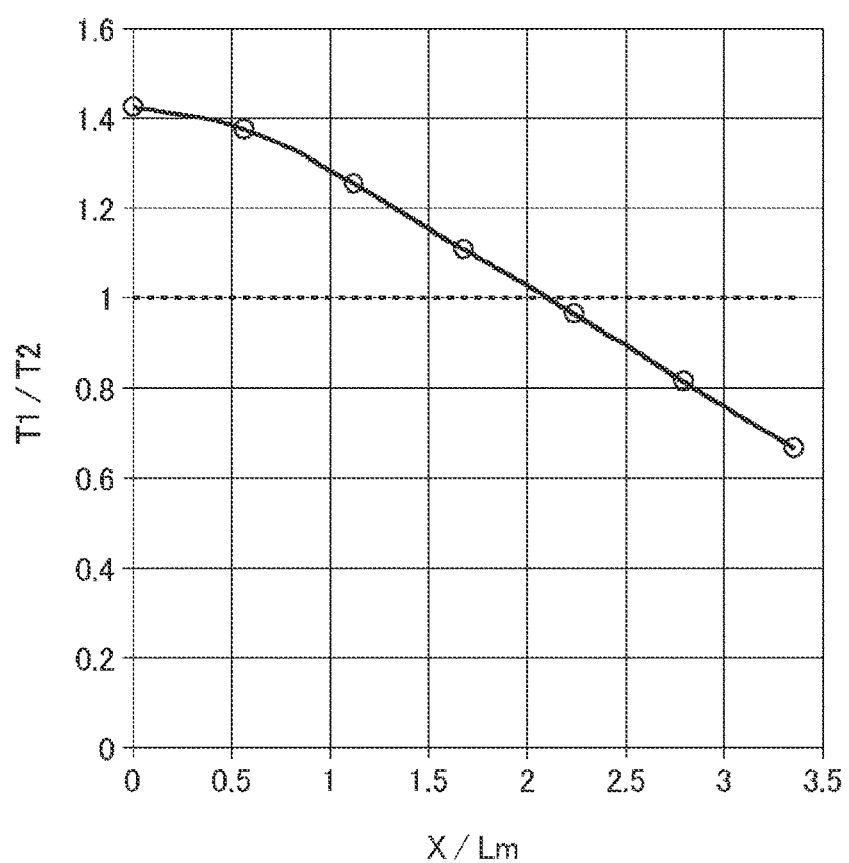
FIG. 23 is a graph showing a relation between T1/T2 and X/Lm, when the number P of magnetic poles of the rotor is 12.

FIG. 21 is a graph showing a relation between T1/T2 and X/Lm, when the number P of magnetic poles of the rotor is 16. FIG. 22 is a graph showing a relation between T1/T2 and X/Lm, when the number P of magnetic poles of the rotor is 14. FIG. 23 is a graph showing a relation between T1/T2 and X/Lm, when the number P of magnetic poles of the rotor is 12.

As evident from FIG. 21 to FIG. 23, the value of T1/T2 decreases as the shift length X increases. This indicates that as the shift length X becomes larger, the effect of increasing, by the Z magnets, the average magnetic flux density in the outer circumferential part of the rotor degrades. Thus, the effect of Z magnets is observed at least when T1/T2 is 1.0 or above. According to the results shown in FIG. 21 to FIG. 23, the effect of increasing, by the Z magnets, the average magnetic flux density in the outer circumferential part of the rotor is verified when the value of X/Lm is lies in a range of at or below 2.0, regardless of the number of magnetic poles of the rotor. It is more preferable that the value of X/Lm lies in a range of at or below 1.0, when the magnetic pole phase of a θ magnet and the magnetic pole phase of a Z magnet are made to differ or shifted from each other.

A description is now given of a case where an electrical angle φe is used, in the place of the shift length X, as a parameter expressing a phase shift (phase lag) between the θ magnet and the Z magnet. If, as shown in FIG. 20B, the shift length X is replaced by a mechanical angle φm, then the electrical angle φe will be expressed as follows.

$$\phi e = \phi m \times (P/2),$$

where P is the number of magnetic poles.

Figure 24:
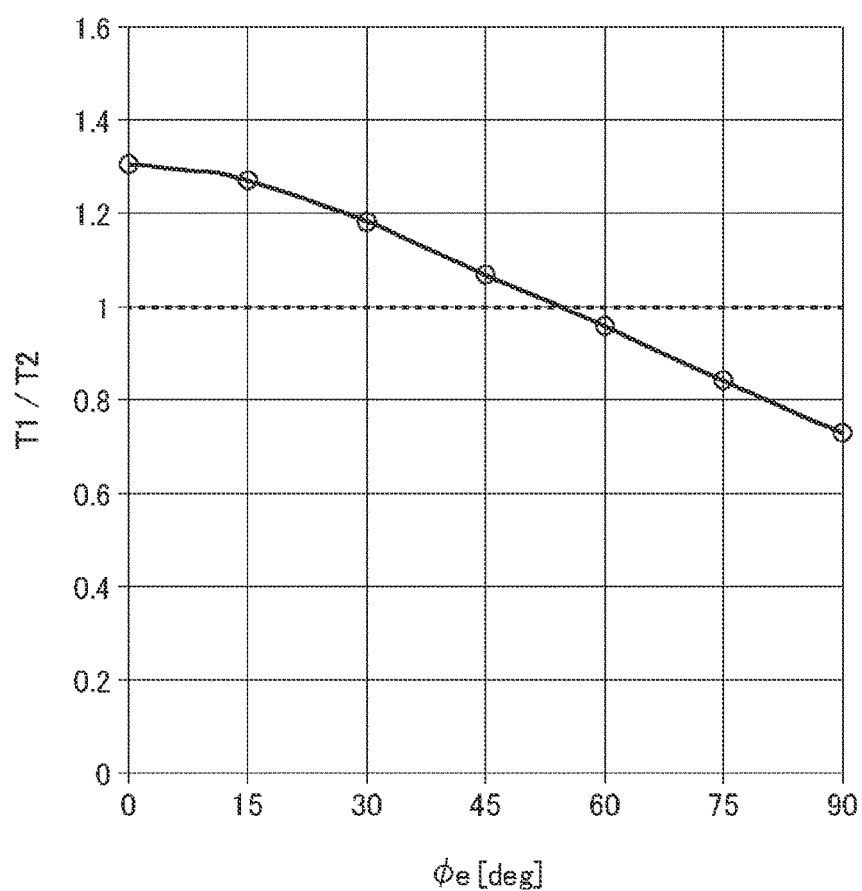
FIG. 24 is a graph showing a relation between T1/T2 and an electrical angle φe, when the number P of magnetic poles of the rotor is 16.
Figure 25:
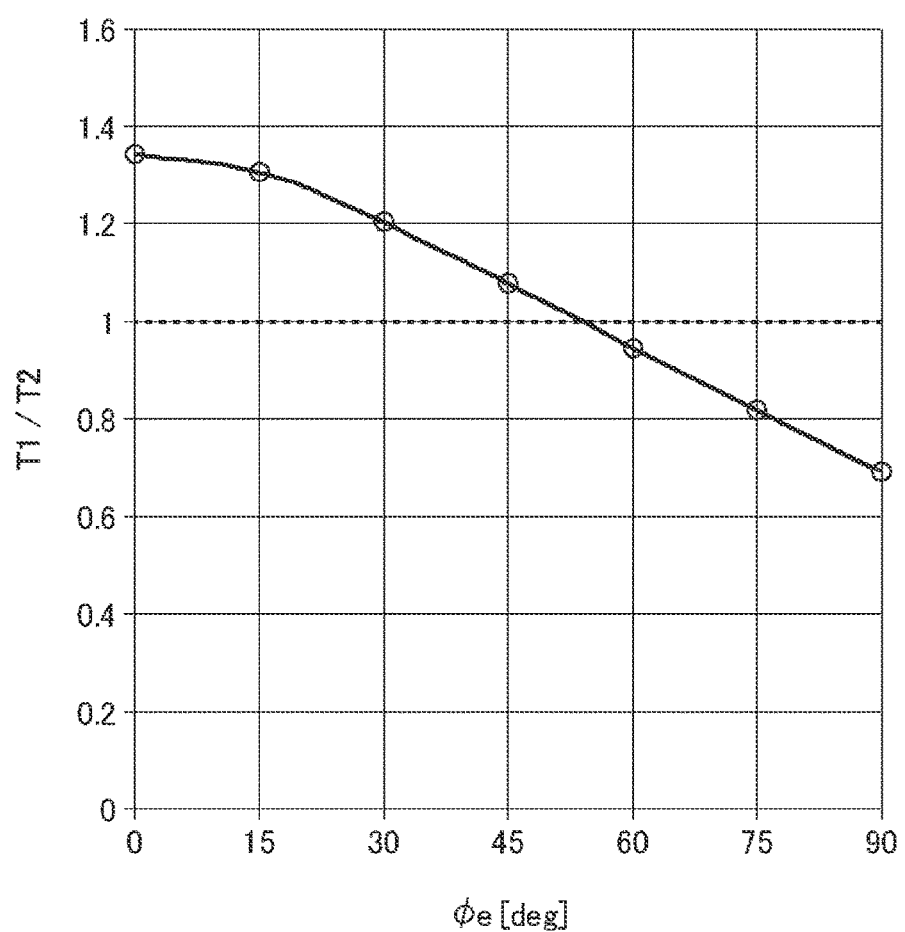
FIG. 25 is a graph showing a relation between T1/T2 and the electrical angle φe, when the number P of magnetic poles of the rotor is 14.
Figure 26:
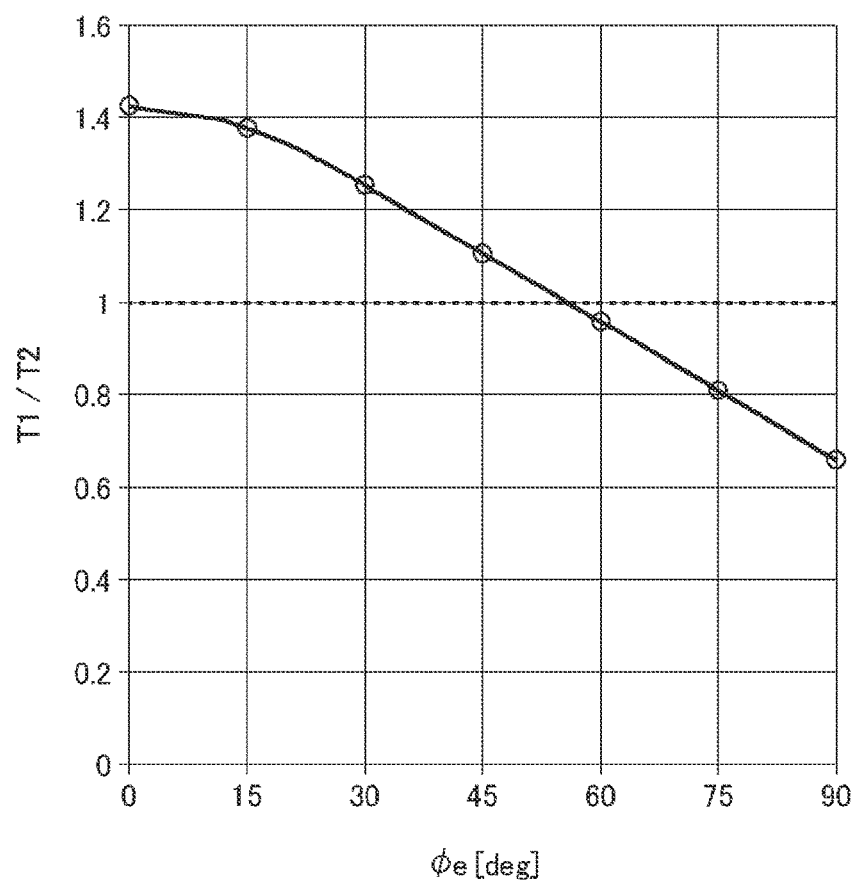
FIG. 26 is a graph showing a relation between T1/T2 and the electrical angle φe, when the number P of magnetic poles of the rotor is 12.

FIG. 24 is a graph showing a relation between T1/T2 and the electrical angle φe, when the number P of magnetic poles of the rotor is 16. FIG. 25 is a graph showing a relation between T1/T2 and the electrical angle φe, when the number P of magnetic poles of the rotor is 14. FIG. 26 is a graph showing a relation between T1/T2 and the electrical angle φe, when the number P of magnetic poles of the rotor is 12.

As evident from FIG. 24 to FIG. 26, the value of T1/T2 decreases as the electrical angle φe increases. This indicates that as the electrical angle φe becomes larger, the effect of increasing, by the Z magnets, the average magnetic flux density in the outer circumferential part of the rotor degrades. Thus, the effect of Z magnets is observed at least when T1/T2 is 1.0 or above. According to the results shown in FIG. 24 to FIG. 26, the effect of increasing, by the Z magnets, the average magnetic flux density in the outer circumferential part of the rotor is verified when the value of the electrical angle φe lies in a range of at or below 50 degrees, regardless of the number of magnetic poles of the rotor. It is more preferable that the value of the electrical angle φe lies in a range of at or below 30 degrees, when the magnetic pole phase of a θ magnet and the magnetic pole phase of a Z magnet are made to differ or shifted from each other.

Next, the lower limit of the shift length X will be examined. If the shift length X is small, the magnetic flux density inside the θ magnet may drop due to the magnetic force of the Z magnet, which in turn may possibly degrade the demagnetization resistance. In the light of this, calculated is how many times the average magnetic flux density Bm inside the θ magnet becomes larger than the residual magnetic flux density Br of the θ magnet, depending on the change in the shift length X, using the simulation runs. More specifically, the relation between magnetic flux density ratio (Bm/Br) and the ratio (X/Lm) of the shift length X to the thickness Lm of θ magnet is shown graphically.

Figure 27:
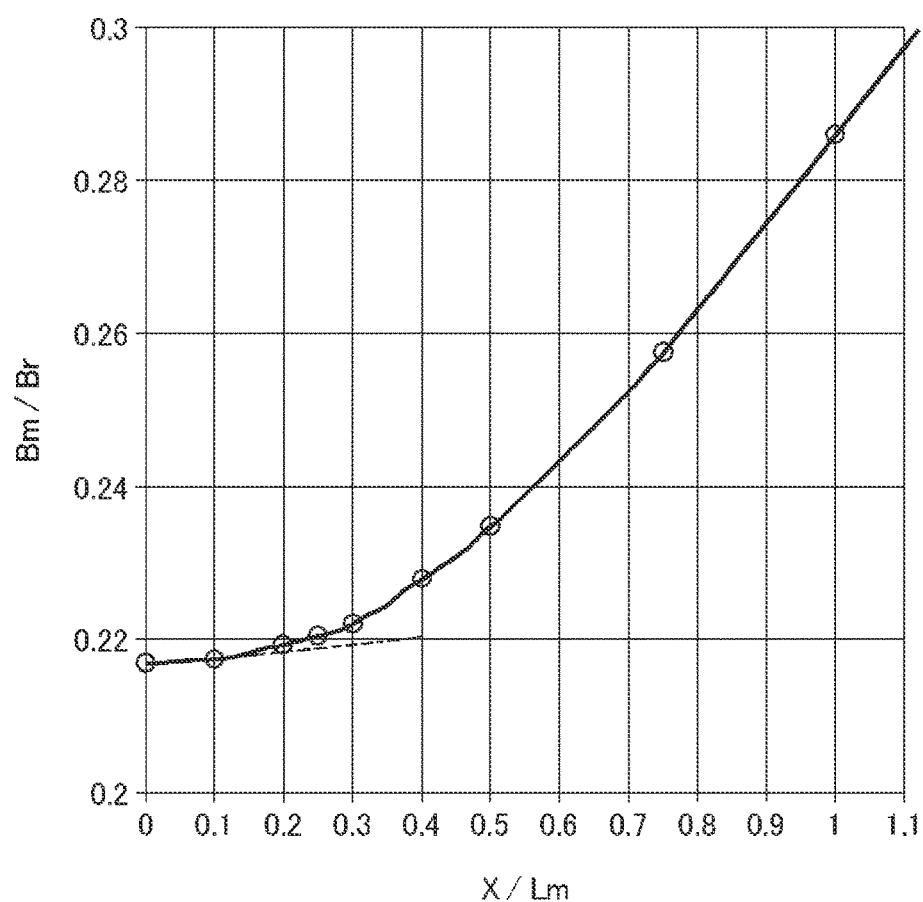
FIG. 27 is a graph showing a relation between Bm/Br and X/Lm, when the number P of magnetic poles of the rotor is 16.
Figure 28:
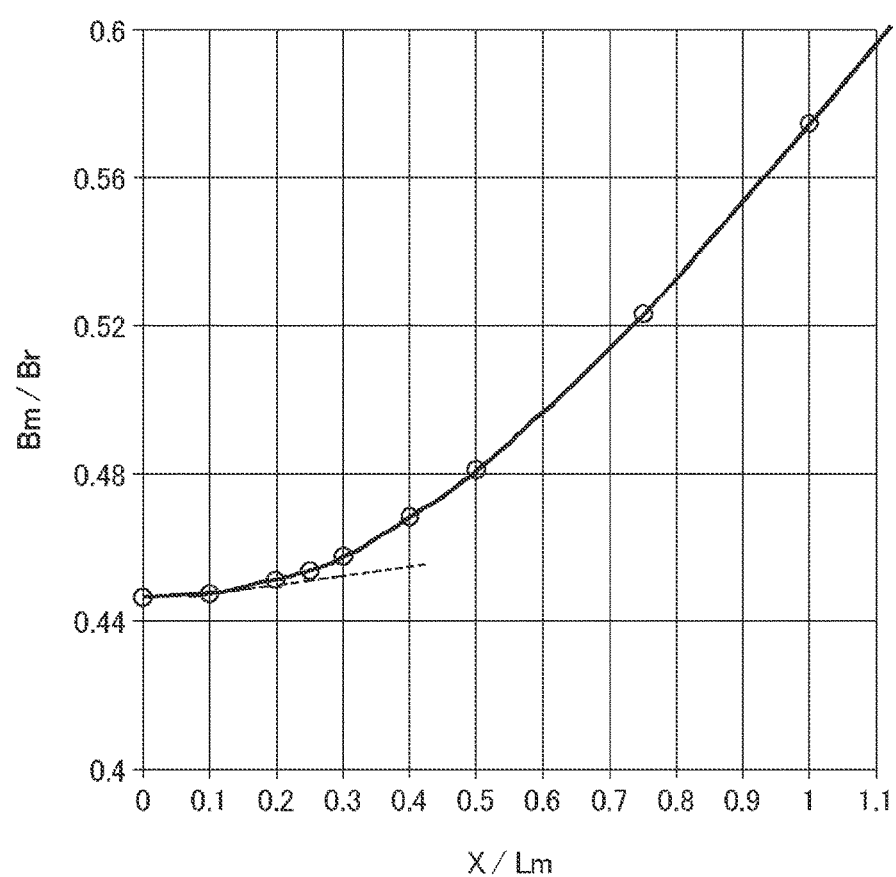
FIG. 28 is a graph showing a relation between Bm/Br and X/Lm, when the number P of magnetic poles of the rotor is 14.
Figure 29:
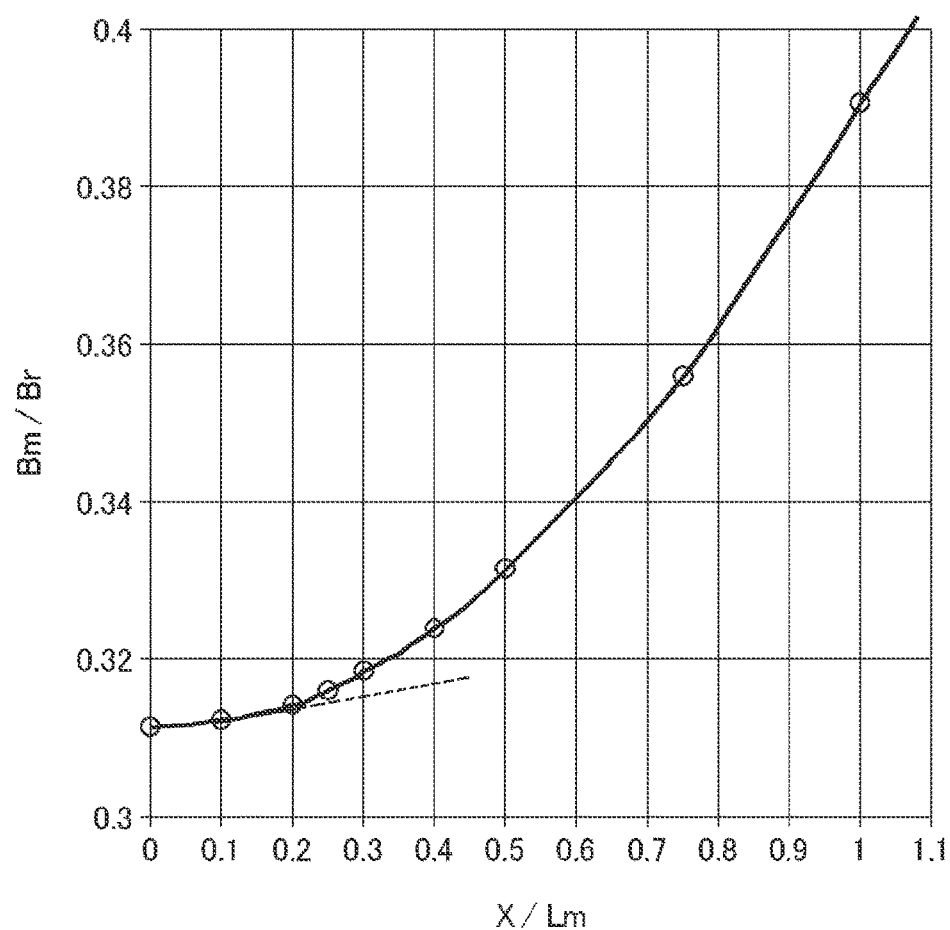
FIG. 29 is a graph showing a relation between Bm/Br and X/Lm, when the number P of magnetic poles of the rotor is 12.

FIG. 27 is a graph showing a relation between Bm/Br and X/Lm, when the number P of magnetic poles of the rotor is 16. FIG. 28 is a graph showing a relation between Bm/Br and X/Lm, when the number P of magnetic poles of the rotor is 14. FIG. 29 is a graph showing a relation between Bm/Br and X/Lm, when the number P of magnetic poles of the rotor is 12.

As evident from FIG. 27 to FIG. 29, the value of Bm/Br decreases as the shift length X decreases. This indicates that as the shift length X gets smaller, the demagnetization of the θ magnet by the Z magnet becomes larger. In other words, as the shift length X becomes larger, the effect of the Z magnet on the demagnetization of the θ magnet is suppressed. According to the results shown in FIG. 27 to FIG. 29, the effect of the Z magnet on the demagnetization of the θ magnet can be suppressed regardless of the number of magnetic poles of the rotor, as long as the value of X/Lm lies in a range of at or above 0.2. It is more preferable that the value of X/Lm lies in a range of at or above 0.4, when the magnetic pole phase of the θ magnet and the magnetic pole phase of the Z magnet are made to differ or shifted from each other.

A description is next given of another case where the electrical degree φe is used, in the place of the shift length X, as a parameter expressing the phase shift (phase lag) between the θ magnet and the Z magnet.

Figure 30:
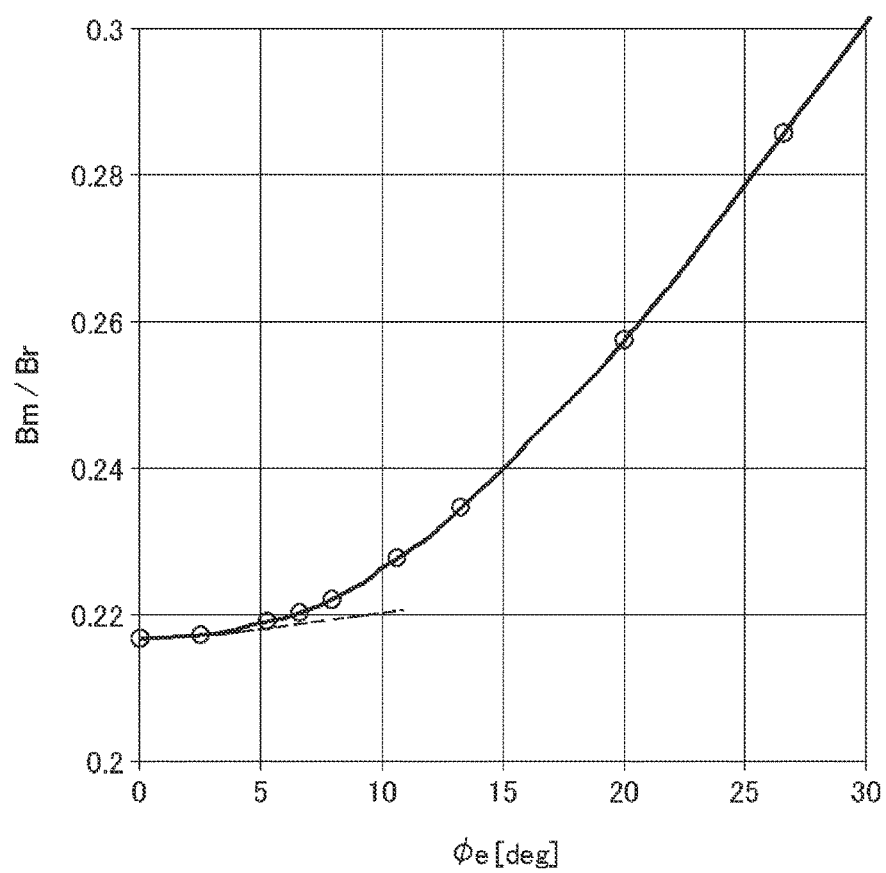
FIG. 30 is a graph showing a relation between Bm/Br and the electrical angle φe, when the number P of magnetic poles of the rotor is 16.
Figure 31:
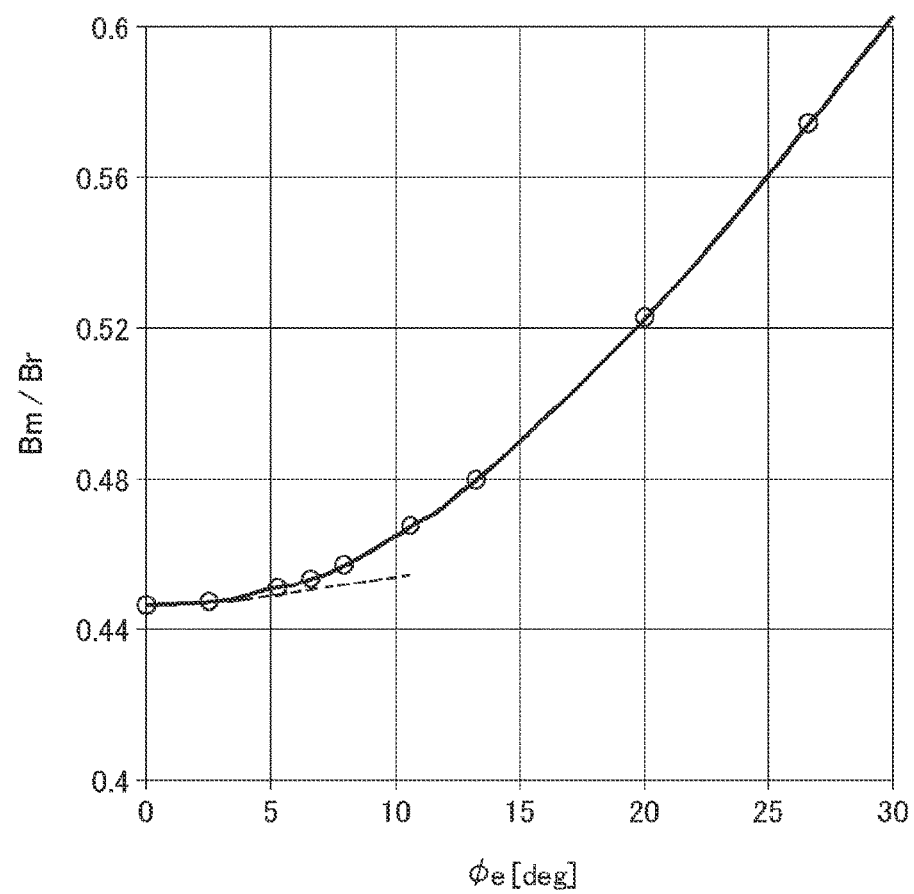
FIG. 31 is a graph showing a relation between Bm/Br and the electrical angle φe, when the number P of magnetic poles of the rotor is 14.
Figure 32:
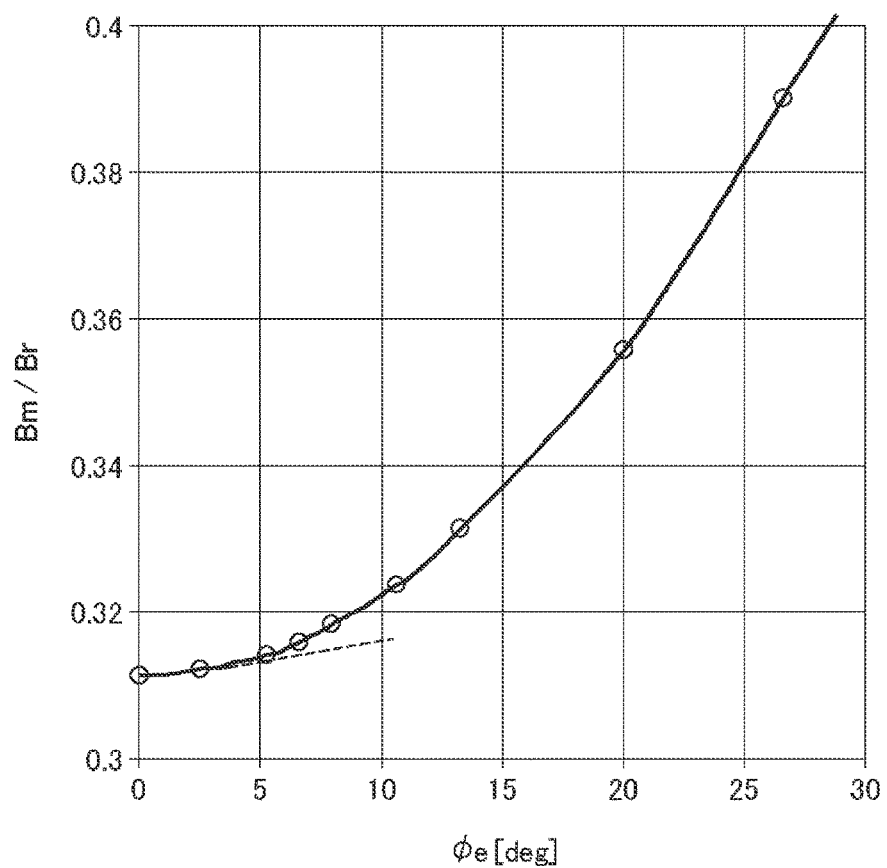
FIG. 32 is a graph showing a relation between Bm/Br and the electrical angle φe, when the number P of magnetic poles of the rotor is 12.

FIG. 30 is a graph showing a relation between Bm/Br and the electrical angle φe, when the number P of magnetic poles of the rotor is 16. FIG. 31 is a graph showing a relation between Bm/Br and the electrical angle e, when the number P of magnetic poles of the rotor is 14. FIG. 32 is a graph showing a relation between Bm/Br and the electrical angle φe, when the number P of magnetic poles of the rotor is 12.

As evident from FIG. 24 to FIG. 26, the value of Bm/Br decreases as the electrical angle φe decreases. This indicates that as the electrical angle φe becomes smaller, the demagnetization of the θ magnet by the Z magnet becomes larger. In other words, as the electrical angle φe becomes larger, the effect of the Z magnet on the demagnetization of the θ magnet is suppressed. According to the results shown in FIG. 30 to FIG. 32, the effect of the Z magnet on the demagnetization of the θ magnet can be suppressed regardless of the number of magnetic poles of the rotor, as long as the value of the electrical angle φe is in a range of at or above 5 degrees. It is more preferable that the value of the electrical angle φe is in a range of at or above 10 degrees, when the magnetic pole phase of the θ magnet and the magnetic pole phase of the Z magnet are made to differ or shifted from each other.

As described above, the rotor 68 according to the sixth embodiment can reduce the repulsive force exerted between the θ magnet 28 contained therein and the Z magnet 60. Also, the rotor 68 can improve the demagnetization resistance of the θ magnet 28.

Suppose, in this manner, that the phase of an N-pole of the opposed face of a Z magnet is shifted relative to the phase of an N-pole in the outer circumferential surface of the rotor core. Then, the shift length X [mm], relative to the position of an N-pole in the outer circumferential surface, at a position shifted in the rotational direction of the rotor core in an outer circumferential part corresponding to the phase of the N-pole of the opposed face of the Z magnet, is preferably so set as to satisfy the following inequalities.

$0.2 \leq X/Lm \leq 2.0$, where Lm [mm] is the thickness of the θ magnets in the circumferential direction of the rotor core. Thereby, the repulsive force exerted between the rotor core and the auxiliary magnets is suppressed while the average magnetic flux density in the outer circumferential part of the rotor is increased, so that the average magnetic flux density in the outer circumferential part of the rotor can be increased.

Also, the a shift electrical angle φe between the phase of an N-pole of the opposed face of a Z magnet and the phase of an N-pole in the outer circumferential surface of the rotor core may be preferably so set as to satisfy the following inequalities.

$$5 \text{ degrees} \leq \phi e \leq 50 \text{ degrees.}$$

Thereby, the repulsive force exerted between the rotor core and the auxiliary magnets is suppressed while the flux leakage from the rotor is reduced, so that the average magnetic flux density in the outer circumferential part of the rotor can be increased. [0108] As shown in FIG. 20B, one of a pair of ring-shape Z magnets 60, namely a magnet denoted by the reference numeral 60a, is so provided that, in a phase in a rotational direction of the rotor core, the phase of an N-pole of the opposed face is shifted, by α degrees (α>0), relative to the phase of an N-pole in the outer circumferential surface of the rotor core. And the other of the pair of ring-shape Z magnets 60, namely a magnet denoted by the reference numeral 60b, is so provided that, in a phase in the rotational direction of the rotor core, the phase of an N-pole of the opposed face is shifted, by −α degrees (α>0), relative to the phase of an N-pole in the outer circumferential surface of the rotor core.

Note that, in the rotor according to the sixth embodiment, the number Q of magnetic poles of the Z magnets is identical to the number P of magnetic poles of the rotor. Thereby, the flux leakage from the rotor can be further reduced. Also, the thickness of the Z magnets in the direction of the rotating shaft thereof may be in a range of 1 mm to 15 mm.

Note that the motor according to the above-described embodiments is comprised of a cylindrical stator, where a plurality of winding wires are placed, the above-described rotor provided in the center of the stator, and a power feed section that supplies power to the plurality of winding wires of the stator. According to the above-described embodiments, the flux leakage from the rotor provided in the motor can be reduced and the average magnetic flux density in the outer circumferential part of the rotor can be increased.

The present invention has been described by referring to each of the above-described embodiments. However, the present invention is not limited to the above-described embodiments only, and those resulting from any appropriate combination or substitution of components in the embodiments are also effective as embodiments. Also, it is understood by those skilled in the art that modifications such as changes in the order of combination or processings made as appropriate in each embodiment or various changes in design may be added to the embodiments based on their knowledge and that the embodiments added with such modifications are also within the scope of the present invention.

A description is given hereunder of a modification of the relief parts in each of the above-described embodiments.

Figure 33A:
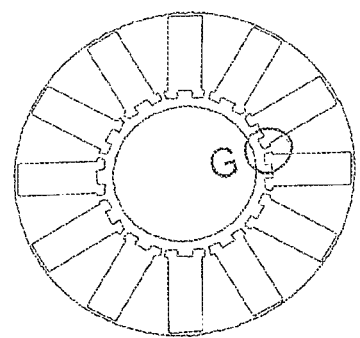
FIG. 33A is a top view of a rotor core according to an example of a first exemplary modification.
Figure 33B:
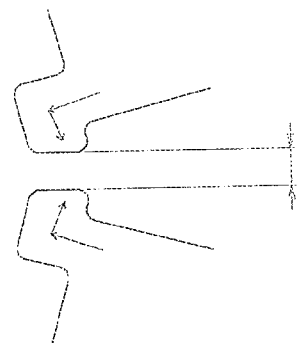
FIG. 33B is an enlarged view of region G in FIG. 33A.

FIG. 33A is a top view of a rotor core according to an example of a first modification. FIG. 33B is an enlarged view of region G in FIG. 33A. A rotor core 110 shown in FIG. 33A is configured such that radial relief parts are formed in the center-side end of the rotor core 110 and such that circumferential relief parts are further formed from the radial relief parts.

FIG. 34A to FIG. 34H are top views of rotor cores according to other examples of the first modification.

Figure 34A:
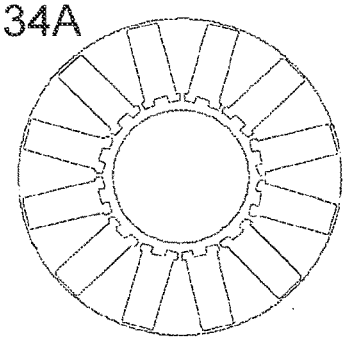
FIG. 34A to FIG. 34H are top views of rotor cores according to other examples of the first modification.

A rotor core shown in FIG. 34A is configured such that the periphery of the rotor core is not separated and such that no relief parts is formed in an end opposite to the center side of the rotor core. A rotor core shown in FIG. 34B is configured such that the periphery of the rotor core is not separated and such that the circumferential relief parts are formed in the end opposite to the center side of the rotor core. A rotor core shown in FIG. 34C is configured such that the periphery of the rotor core is not separated and such that the radial relief parts are formed in the end opposite to the center side of the rotor core. A rotor core shown in FIG. 34D is configured such that the periphery of the rotor core is not separated and such that the circumferential relief parts and the radial relief parts are formed in the end opposite to the center side of the rotor core.

Figure 34E:
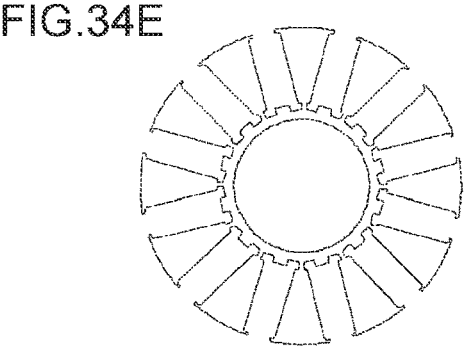
Figure 34B:
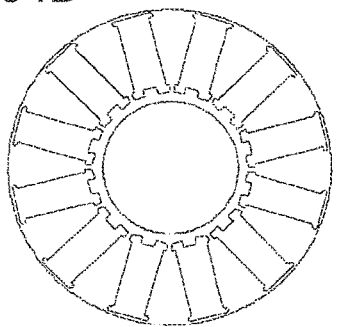
Figure 34F:
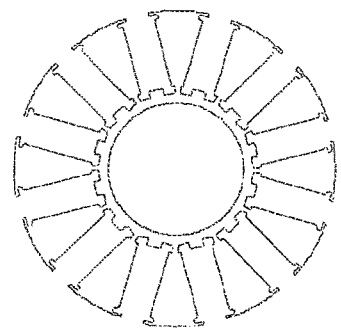
Figure 34C:
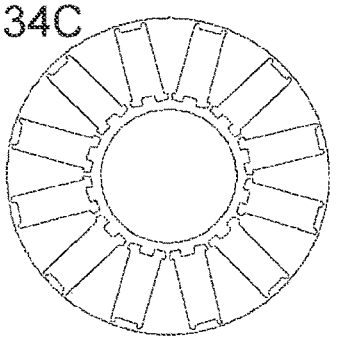
Figure 34G:
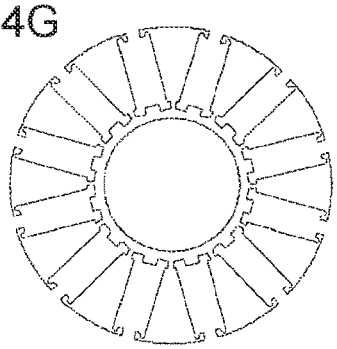
Figure 34D:
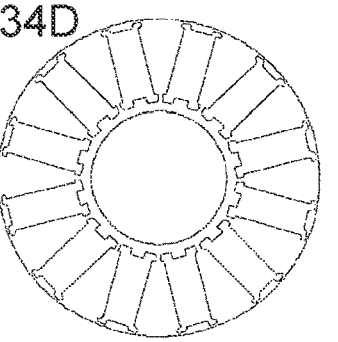
Figure 34H:
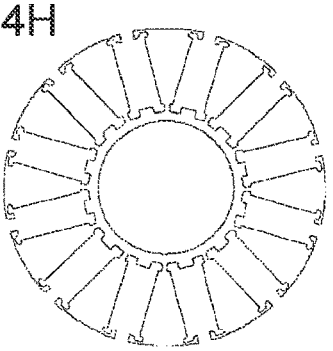

A rotor core shown in FIG. 34E is configured such that the periphery of the rotor core is separated and such that no relief parts is formed in an end opposite to the center side of the rotor core. A rotor core shown in FIG. 34F is configured such that the periphery of the rotor core is separated and such that the circumferential relief parts are formed in the end opposite to the center side of the rotor core. A rotor core shown in FIG. 34G is configured such that the periphery of the rotor core is separated and such that the radial relief parts are formed in the end opposite to the center side of the rotor core. A rotor core shown in FIG. 34H is configured such that the periphery of the rotor core is separated and such that the circumferential relief parts and the radial relief parts are formed in the end opposite to the center side of the rotor core.

Figure 35A:
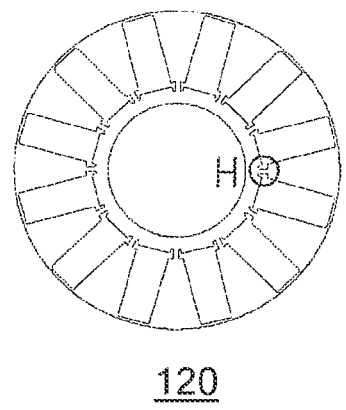
FIG. 35A is a top view of a rotor core according to an example of a second modification.
Figure 35B:
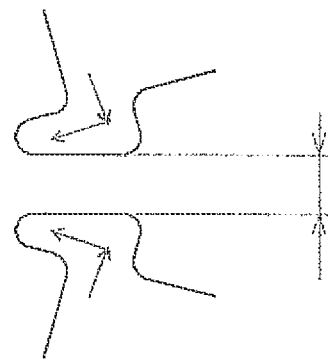
FIG. 35B is an enlarged view of region H in FIG. 35A.

FIG. 35A is a top view of a rotor core according to an example of a second modification. FIG. 35B is an enlarged view of region H in FIG. 35A. A rotor core 120 shown in FIG. 35A is configured such that circumferential relief parts are formed in the center-side end of the rotor core 120 and such that radial relief parts are further formed from the circumferential relief parts.

FIG. 36A to FIG. 36H are top views of rotor cores according to other examples of the second modification.

Figure 36A:
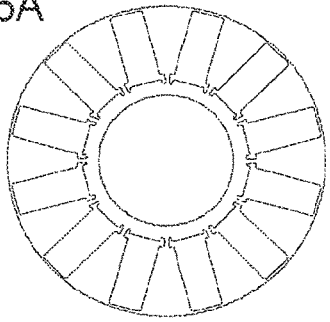
FIG. 36A to FIG. 36H are top views of rotor cores according to other examples of the second modification.

A rotor core shown in FIG. 36A is configured such that the periphery of the rotor core is not separated and such that no relief parts is formed in an end opposite to the center side of the rotor core. A rotor core shown in FIG. 36B is configured such that the periphery of the rotor core is not separated and such that the circumferential relief parts are formed in the end opposite to the center side of the rotor core. A rotor core shown in FIG. 36C is configured such that the periphery of the rotor core is not separated and such that the radial relief parts are formed in the end opposite to the center side of the rotor core. A rotor core shown in FIG. 36D is configured such that the periphery of the rotor core is not separated and such that the circumferential relief parts and the radial relief parts and are formed in the end opposite to the center side of the rotor core.

Figure 36E:
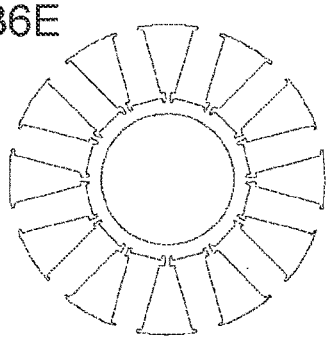
Figure 36B:
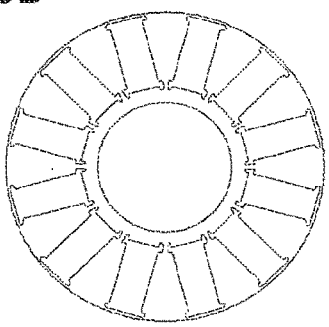
Figure 36F:
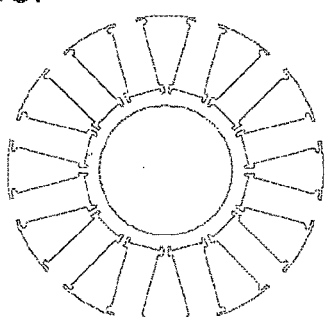
Figure 36C:
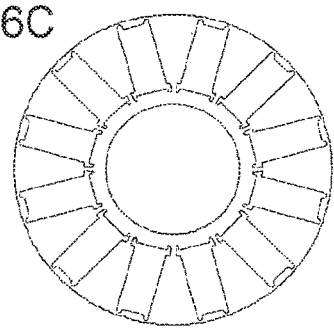
Figure 36G:
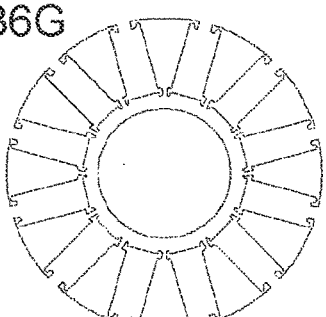
Figure 36D:
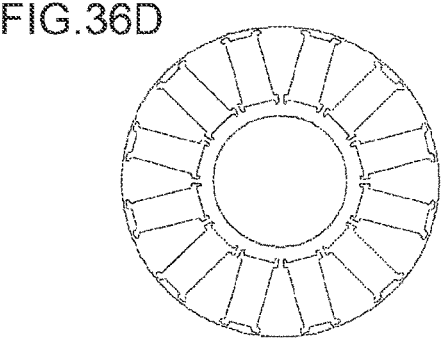
Figure 36H:
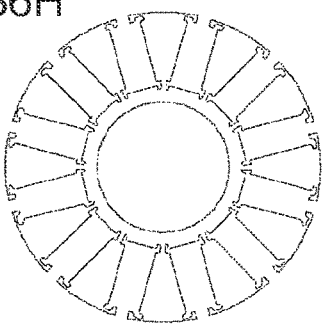

A rotor core shown in FIG. 36E is configured such that the periphery of the rotor core is separated and such that no relief parts is formed in an end opposite to the center side of the rotor core. A rotor core shown in FIG. 36F is configured such that the periphery of the rotor core is separated and such that the circumferential relief parts are formed in the end opposite to the center side of the rotor core. A rotor core shown in FIG. 36G is configured such that the periphery of the rotor core is separated and such that the radial relief parts are formed in the end opposite to the center side of the rotor core. A rotor core shown in FIG. 36H is configured such that the periphery of the rotor core is separated and such that the circumferential relief parts and the radial relief parts are formed in the end opposite to the center side of the rotor core.

Figure 37A:
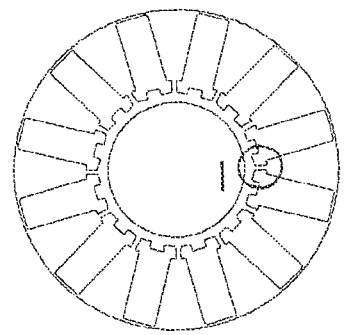
FIG. 37A is a top view of a rotor core according to an example of a third modification.
Figure 37B:
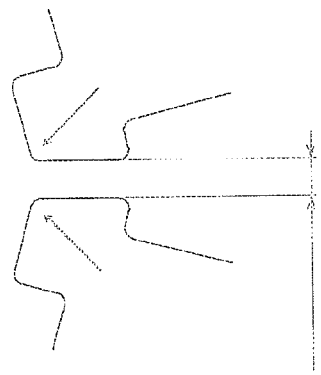
FIG. 37B is an enlarged view of region I in FIG. 37A.

FIG. 37A is a top view of a rotor core according to an example of a third modification. FIG. 37B is an enlarged view of region I in FIG. 37A. A rotor core 130 shown in FIG. 37A is configured such that circumferential relief parts are formed in the center-side end of the rotor core 130 and such that radial relief parts are further formed from the circumferential relief parts.

FIG. 38A to FIG. 38H are top views of rotor cores according to other examples of the third modification.

Figure 38A:
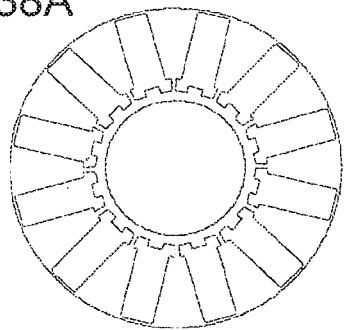
FIG. 38A to FIG. 38H are top views of rotor cores according to other examples of the third modification.

A rotor core shown in FIG. 38A is configured such that the periphery of the rotor core is not separated and such that no relief parts is formed in an end opposite to the center side of the rotor core. A rotor core shown in FIG. 38B is configured such that the periphery of the rotor core is not separated and such that the circumferential relief parts are formed in the end opposite to the center side of the rotor core. A rotor core shown in FIG. 38C is configured such that the periphery of the rotor core is not separated and such that the radial relief parts are formed in the end opposite to the center side of the rotor core. A rotor core shown in FIG. 38D is configured such that the periphery of the rotor core is not separated and such that the circumferential relief parts and the radial relief parts and are formed in the end opposite to the center side of the rotor core.

Figure 38E:
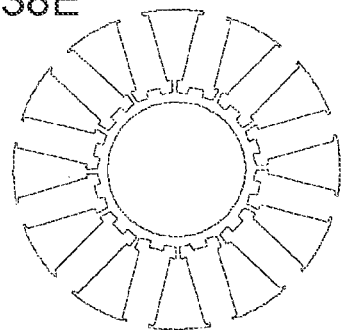
Figure 38B:
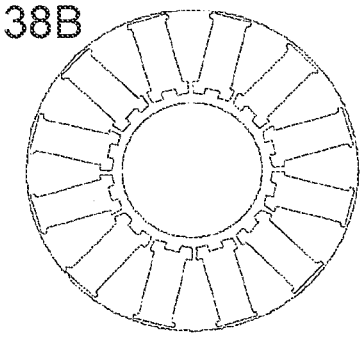
Figure 38F:
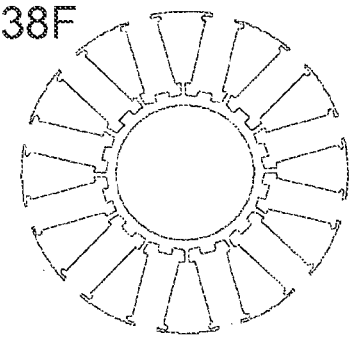
Figure 38C:
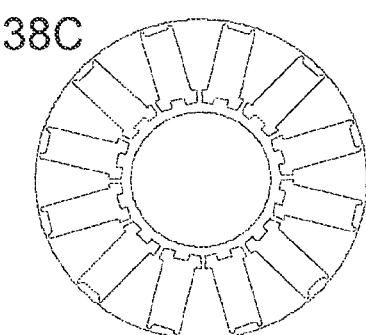
Figure 38G:
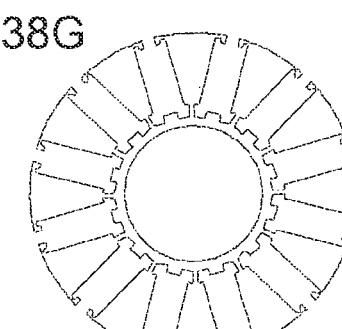
Figure 38D:
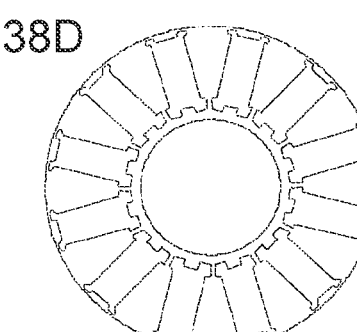
Figure 38H:
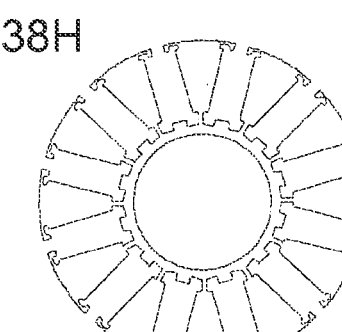

A rotor core shown in FIG. 38E is configured such that the periphery of the rotor core is separated and such that no relief parts is formed in an end opposite to the center side of the rotor core. A rotor core shown in FIG. 38F is configured such that the periphery of the rotor core is separated and such that the circumferential relief parts are formed in the end opposite to the center side of the rotor core. A rotor core shown in FIG. 38G is configured such that the periphery of the rotor core is separated and such that the radial relief parts are formed in the end opposite to the center side of the rotor core. A rotor core shown in FIG. 38H is configured such that the periphery of the rotor core is separated and such that the circumferential relief parts and the radial relief parts are formed in the end opposite to the center side of the rotor core.

What is claimed is:

1. A rotor comprising:
   a circular rotor core;
   a plurality of plate-like magnets; and
   a pair of ring-shaped auxiliary magnets disposed, in both end faces of the rotor core in a direction of a rotating shaft thereof, respectively, in such a manner as to face the rotor core,
   wherein the rotor core has a plurality of magnet holding sections formed radially with the rotating shaft as a center,
   wherein the plate-like magnets are held in the magnet holding section such that the same magnetic poles of adjacent magnets face each other in a circumferential direction of the rotor core, wherein the rotor core is such that an N-pole and an S-pole are alternately formed in a circumferential direction of an outer circumferential surface of the rotor core, wherein the auxiliary magnets are such that an N-pole and an S-pole are alternately formed circularly on an opposed face of the auxiliary magnet facing an end face of the rotor core in the direction of the rotating shaft thereof, wherein the auxiliary magnets are provided such that, in a phase in a rotational direction of the rotor core, the phase of the N-pole of the opposed face is shifted relative to the phase of the N-pole in the outer circumferential surface of the rotor core, wherein one of the pair of ring-shaped auxiliary magnets is provided such that, in the phase in the rotational direction of the rotor core, the phase of the N-pole of the opposed face is shifted, by α degrees (α>0), relative to the phase of the N-pole in the outer circumferential surface of the rotor core, wherein the other of the pair of ring-shaped auxiliary magnets is provided such that, in the phase in the rotational direction of the rotor core, the phase of the N-pole of the opposed face is shifted, by −α degrees (α>0), relative to the phase of the N-pole in the outer circumferential surface of the rotor core, wherein a shift electrical angle φe between the phase of the N-pole of the opposed face of the auxiliary magnet and the phase of the N-pole in the outer circumferential surface of the rotor core may be so set as to satisfy $$5 \text{ degrees} \leq \phi e \leq 50 \text{ degrees}.$$

2. The rotor according to claim 1, wherein, when the phase of the N-pole of the opposed face of the auxiliary magnet is shifted relative to the phase of the N-pole in the outer circumferential surface of the rotor core, a shift length X [mm], relative to a position of the N-pole in the outer circumferential surface of the rotor core, at a position shifted in the rotational direction of the rotor core in an outer circumferential part corresponding to the phase of the N-pole of the opposed face of the auxiliary magnet, is so set as to satisfy $$0.2 \leq X/Lm \leq 2.0,$$

where Lm [mm] is the thickness of the plate-like magnet in the circumferential direction of the rotor core.

3. The rotor according to claim 2, wherein the thickness of the plate-like magnet in the circumferential direction of the rotor core is in a range of 1 mm to 25 mm.

4. The rotor according to claim 3, wherein the number P of magnetic poles of the rotor is any one of 12 poles, 14 poles, 16 poles, 18 poles and 20 poles.

5. The rotor according to claim 2, wherein the number P of magnetic poles of the rotor is any one of 12 poles, 14 poles, 16 poles, 18 poles and 20 poles.

6. The rotor according to claim 1, wherein the number P of magnetic poles of the rotor is any one of 12 poles, 14 poles, 16 poles, 18 poles and 20 poles.

7. The rotor according to claim 6, wherein the number Q of magnetic poles of the auxiliary magnets is identical to the number P of magnetic poles of the rotor.

8. The rotor according to claim 1, wherein the thickness of the auxiliary magnet in the direction of the rotating shaft thereof is in a range of 1 mm to 15 mm.

9. The rotor according to claim 1, wherein the number P of magnetic poles of the rotor is any one of 12 poles, 14 poles, 16 poles, 18 poles and 20 poles.

10. A motor comprising:
    a cylindrical stator where a plurality of winding wires are placed;
    the rotor, according to claim 1, provided in a center of the stator; and
    a power feed section configured to supply power to the plurality of winding wires of the stator.

11. The rotor according to claim 1, wherein
    the rotor core includes a plurality of laminated plate-shaped members, and
    given that a thickness of each one of the plate-shaped members is denoted by T [mm], and the shortest distance between adjacent plate-like magnets is denoted by Wb [mm], Wb is so set as to satisfy Wb≤7T.

* * * * *